(12) United States Patent
King et al.

(10) Patent No.: US 7,193,392 B2
(45) Date of Patent: Mar. 20, 2007

(54) SYSTEM AND METHOD FOR DETERMINING AND BALANCING STATE OF CHARGE AMONG SERIES CONNECTED ELECTRICAL ENERGY STORAGE UNITS

(75) Inventors: Darrell J. King, Belmont, MA (US); Per Onnerud, Framingham, MA (US); Jay J. Shi, Acton, MA (US); Allan Chertok, Bedford, MA (US); J. Thomas Fowler, Marblehead, MA (US); Gerald R. Larocque, Bedford, MA (US)

(73) Assignee: Tiax LLC, Cambridge, MA (US)

( * ) Notice: Subject to any disclaimer, the term of this patent is extended or adjusted under 35 U.S.C. 154(b) by 248 days.

(21) Appl. No.: 10/717,309

(22) Filed: Nov. 19, 2003

(65) Prior Publication Data

US 2004/0135544 A1 Jul. 15, 2004

Related U.S. Application Data

(60) Provisional application No. 60/464,391, filed on Apr. 18, 2003, provisional application No. 60/428,666, filed on Nov. 25, 2002.

(51) Int. Cl.
*H01M 10/44* (2006.01)
*H01M 10/46* (2006.01)

(52) U.S. Cl. ..................................... 320/118
(58) Field of Classification Search ............... 320/116, 320/118, 119, 130, 132
See application file for complete search history.

(56) References Cited

U.S. PATENT DOCUMENTS

| | | | |
|---|---|---|---|
| 1,325,994 A | 12/1919 | Perkins | |
| 2,142,377 A | 1/1939 | Roth | |
| 2,238,171 A | 4/1941 | Johnson et al. | |
| 2,345,159 A | 3/1944 | Schroter et al. | |
| 3,077,548 A | 2/1963 | Moressee et al. | |
| 5,438,250 A | 8/1995 | Retzlaff | |
| 5,592,067 A * | 1/1997 | Peter et al. | 320/118 |
| 5,631,534 A * | 5/1997 | Lewis | 320/119 |
| 5,656,915 A | 8/1997 | Eaves | |
| 6,008,623 A | 12/1999 | Chen et al. | |
| 6,157,167 A | 12/2000 | Schwartz et al. | |
| 6,225,780 B1 | 5/2001 | Koch | |
| 6,239,579 B1 | 5/2001 | Dunn et al. | |
| 6,271,645 B1 | 8/2001 | Schneider et al. | |
| 6,275,004 B1 | 8/2001 | Tamai et al. | |
| 6,278,604 B1 | 8/2001 | Patel et al. | |
| 6,285,161 B1 | 9/2001 | Popescu | |
| 6,288,521 B1 | 9/2001 | Meador | |
| 6,291,972 B1 | 9/2001 | Zhang | |
| 6,297,619 B1 | 10/2001 | Terada | |
| 6,310,463 B1 | 10/2001 | Nagaoka et al. | |
| 6,329,796 B1 | 12/2001 | Popescu | |
| 6,337,555 B1 | 1/2002 | Oh | |
| 6,340,880 B1 | 1/2002 | Higashijima et al. | |
| 6,351,097 B1 | 2/2002 | Oh | |
| 6,356,055 B1 | 3/2002 | Lin et al. | |
| 6,369,546 B1 | 4/2002 | Canter | |
| 6,373,223 B1 | 4/2002 | Anzawa et al. | |
| 6,437,539 B2 | 8/2002 | Olsson et al. | |
| 6,441,583 B1 | 8/2002 | Perelle | |
| 6,504,344 B1 | 1/2003 | Adams et al. | |
| 6,518,725 B2 | 2/2003 | Marten | |
| 2002/0047685 A1 | 4/2002 | Perelle | |
| 2002/0109482 A1 | 8/2002 | Anzawa et al. | |
| 2002/0167294 A1 | 11/2002 | Odaohhara | |
| 2002/0190692 A1 | 12/2002 | Marten | |
| 2002/0195994 A1 | 12/2002 | Perelle | |
| 2003/0139888 A1 | 7/2003 | Burns | |
| 2005/0140335 A1 | 6/2005 | Lee et al. | |

FOREIGN PATENT DOCUMENTS

| | | |
|---|---|---|
| EP | 0 432 639 A2 | 12/1990 |
| EP | 0 863 598 A1 | 9/1998 |
| EP | 1 014 533 A2 | 6/2000 |
| EP | 1 158 647 A1 | 11/2001 |
| EP | 0 958 634 B1 | 2/2002 |
| JP | 10-084627 | 3/1998 |
| JP | 11-103534 | 4/1999 |
| JP | 2000-193694 | 7/2000 |
| JP | 2001-136669 | 5/2001 |
| JP | 2001-325994 | 11/2001 |

(Continued)

OTHER PUBLICATIONS

Hopkins, D.C., et al., "Dynamic Equalization During Charging of Serial Energy Storage Elements," *IEEE Transaction on Inducstry Applications*, 29(2):363-367, (1993).
Pop, V., et al., State-of-the-art of battery of state-of-charge determination, Published Oct. 31, 2005; Meas. Sci. Technol. 16(2005) R93-R110.

*Primary Examiner*—Edward H. Tso
(74) *Attorney, Agent, or Firm*—Finch & Nguyen PLLC

(57) ABSTRACT

A system and method for determining and balancing state of charge among plural series connected electrical energy storage units is provided. State of change of a selected storage unit in a string of storage units is determined by (i) applying a non-dissipative load to the selected storage unit, resulting in an energy transfer between the selected storage unit and the string of electrical energy storage units through the non-dissipative load and (ii) determining the state of charge of the selected unit from voltage and current data of the selected storage unit resulting from the energy transfer. When the state of charge of the selected unit is different than a target state of charge, energy can be transferred between the selected unit and the string of storage units, such that the state of charge of the selected unit converges toward the target state of charge.

42 Claims, 19 Drawing Sheets

FOREIGN PATENT DOCUMENTS

| | | |
|---|---|---|
| JP | 2002-238171 | 8/2002 |
| JP | 2002-345159 | 11/2002 |
| JP | 2003-77548 | 3/2003 |
| WO | WO 01/56062 A2 | 8/2001 |
| WO | WO 02/09223 A1 | 1/2002 |
| WO | WO 02/23664 A1 | 3/2002 |
| WO | WO 02/080332 A1 | 10/2002 |
| WO | WO 02/093712 A2 | 11/2002 |

* cited by examiner

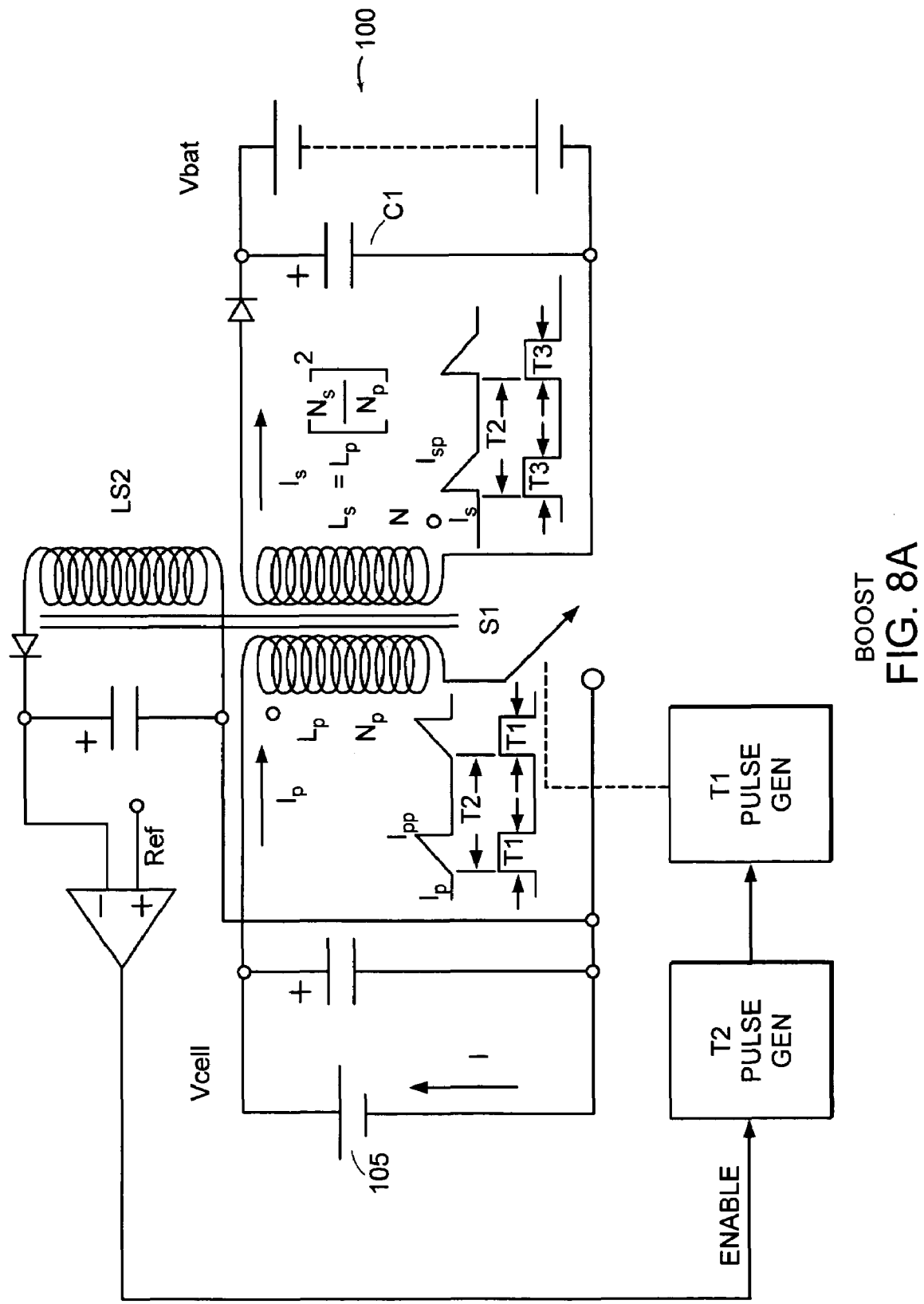
FIG. 8A BOOST

BUCK ated with
SYSTEM AND METHOD FOR DETERMINING AND BALANCING STATE OF CHARGE AMONG SERIES CONNECTED ELECTRICAL ENERGY STORAGE UNITS

RELATED APPLICATIONS

This application claims the benefit of U.S. Provisional Application No. 60/464,391, filed Apr. 18, 2003 and U.S. Provisional Application No. 60/428,666, filed Nov. 25, 2002. The entire teachings of the above applications are incorporated herein by reference.

BACKGROUND OF THE INVENTION

Hybrid electric vehicles (HEVs) combine the internal combustion engine of a conventional vehicle with the battery and electric motor of an electric vehicle. This combination offers the driving range and rapid refueling features to which consumers are accustomed with conventional vehicles, while achieving improved fuel economy and lower emissions.

Typical HEV designs such as those already on the market and those which will be introduced shortly, are so-called "parallel" configurations. In the parallel HEV, the battery powered motor is principally used to boost engine torque for hill climbing and high acceleration demands. When boost torque is not required, the engine drives the electric motor as a generator to recharge the battery. The motor is also driven as a generator during braking events, thus, relieving thermal loading of the conventional friction brakes and enabling recovery of vehicle kinetic and potential energy which is returned to the battery.

The battery "pack" of a typical HEV consists of one or more "modules" of series-connected "cells." Nickel cadmium (NiCad) and nickel metal hydride (NiMH) cells have been successfully employed in recently introduced HEVs while higher performance lithium ion (Li-ion) cells are envisioned for future generation designs.

Desirable attributes of battery cells for HEV applications are high-peak specific power, high specific energy at pulse power, fast charge acceptance to maximize regenerative braking utilization, and long calendar and cycle life. Achieving a favorable HEV battery pack lifetime requires some means to monitor cell state of charge (SOC) and control of cell charging and discharging to assure that all cells in the pack are well "balanced" or "equalized," for example, at a nominally uniform state of charge. The development of means to achieve affordable and reliable balanced cell operation, especially for newer Li-ion cells, has presented significant technical challenges Lithium ion batteries are now widely used in laptop computer and cell-phone products because of their high specific energy. They also have high specific power, high energy efficiency, good high-temperature performance, and low self-discharge. Components of lithium ion batteries could also be recycled. These characteristics make lithium ion batteries desirable for HEV applications. However, to make them commercially viable for HEVs, further development is needed to improve calendar and cycle life and cost.

SUMMARY OF THE INVENTION

If lithium-ion batteries are to be successfully employed in HEV applications, the state of charge of individual battery cells will need to be continuously balanced to maintain a high cell calendar life and cell capacity. Cells must have their state of charge equalized toward a target state of charge so they uniformly support HEV operation. Furthermore, care must be taken to assure that an individual cell is not charged beyond its safe limit. State of charge may be determined from an open circuit cell voltage measurement, or under load, from a measurement of cell voltage combined with cell impedance and current.

Despite the performance advantages of lithium-ion battery technology, there is a cost tradeoff associated with increased complexity of the controls required to equalize the battery state of charge. The achievement of an affordable solution is particularly challenging in the case of very long high voltage series strings of cells required for an HEV.

According to one aspect of the invention, a system and method is provided for determining and balancing state of charge among plural series-connected electrical energy storage units. Cell chemistries other than lithium-ion, such as nickel-cadmium, lead-acid and nickel metal hydride, may also benefit from embodiments of this system and method.

According to one embodiment, state of charge can be determined by (i) applying a non-dissipative load to a selected storage unit in a the string of electrical energy storage units, resulting in an energy transfer between the selected storage unit and the string of storage units through the non-dissipative load; and (ii) determining the state of charge of the selected unit from voltage and current data of the selected storage unit resulting from the energy transfer. In particular embodiments, state of charge can be determined by calculating an impedance of the selected storage unit from the voltage and current data obtained during the energy transfer. The energy can be transferred by pulse currents.

According to one embodiment, the state of charge can be balanced among plural series-connected electrical energy storage units by (i) applying a non-dissipative load to a selected storage unit in a string of electrical energy storage units, resulting in an energy transfer between the selected storage unit and the string of storage units through the non-dissipative load; (ii) determining a state of charge of the selected unit from voltage and current data of the selected storage unit resulting from the energy transfer; and (iii) when the state of charge of the selected unit is different then a target state of charge, transferring energy between the selected unit and the string of storage units, such that the state of charge of the selected unit converges towards the target state of charge.

In particular embodiments, the non-dissipative load can be an up converter which is applied to the selected storage unit in transferring units of energy from the selected storage unit to the string of storage units. In another embodiment, the non-dissipative load can be a down converter which is applied to the selected storage unit and transfers units of energy from the string of storage units to the selected storage unit.

The state of charge can be determined for a selected storage unit by calculating an impedance of the selected storage unit from the voltage and current data obtained during the energy transfer. In particular embodiments, the state of charge can be determined by (i) applying the non-dissipative load to a selected storage unit, resulting in an energy transfer between the selected storage unit and the string of storage units through the non-dissipative load; and (ii) determining an impedance of the selected storage unit from the voltage and current data of the selected storage unit obtained during the energy transfer.

In particular embodiments, the state of charge of the selected storage unit is determined by (i) applying the non-dissipative load to the selected storage unit; (ii) determining a first voltage across the selected storage unit; (iii) determining a first current flowing through the selected storage unit; (iv) determining a second voltage from the first current and the impedance of the selected storage unit; and (v) determining the state of charge based on a voltage difference between the first and second voltages. The energy can be transferred by pulse to current. In particular embodiments, each of the storage units is a storage cell or a battery module. One or more of the storage units can comprise a battery pack.

In particular embodiments, the target state of charge is determined by (i) determining a string impedance from the determined impedance of each storage unit; (ii) determining a first string voltage and string current from the string of storage units; (iii) determining a second string voltage from the string current and the string impedance; (iv) determining a string voltage difference between the first and second string voltages; and (v) determining a target state of charge as a ratio of the string voltage difference to the number of storage units.

In particular embodiments, the system and method for balancing state of charge includes (i) selecting a storage unit from the string of storage units having a state of charge that is different from the target state of charge; and (ii) transferring energy between the selected storage unit and the string of storage units such that the state of charge of the selected unit converges towards the target state of charge.

In particular embodiments, a storage unit is selected from the string of storage units by (i) comparing each of the states of charge of the individual storage units with the target state of charge; and (ii) selecting a storage unit having a state of charge most different from the target state of charge. In another embodiment, storage units having a state of charge that is different from the state of charge are selected in sequential order.

In particular embodiments, energy is transferred between the selected storage unit and the string of storage units by (i) comparing the state of charge of the selected storage unit with the target state of charge; (ii) when the state of charge is less then the state of charge, energy is transferred from the string of storage units to charge the selected storage unit; and (iii) when the state of charge is greater than the target state of charge, energy is transferred from the selected storage unit to charge the string of storage units.

In particular embodiments, when the state of charge is less than the state of charge, energy is transferred from the string to the selected storage unit until a charge time expires. Conversely when the state of charge is greater than the target state of charge, energy is transferred from the selected storage unit to the string until a discharge time expires.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8A is a schematic diagram illustrating the operation of a boost converter according to one embodiment.

DETAILED DESCRIPTION OF THE INVENTION

A description of preferred embodiments of the invention follows.

Figure 1:
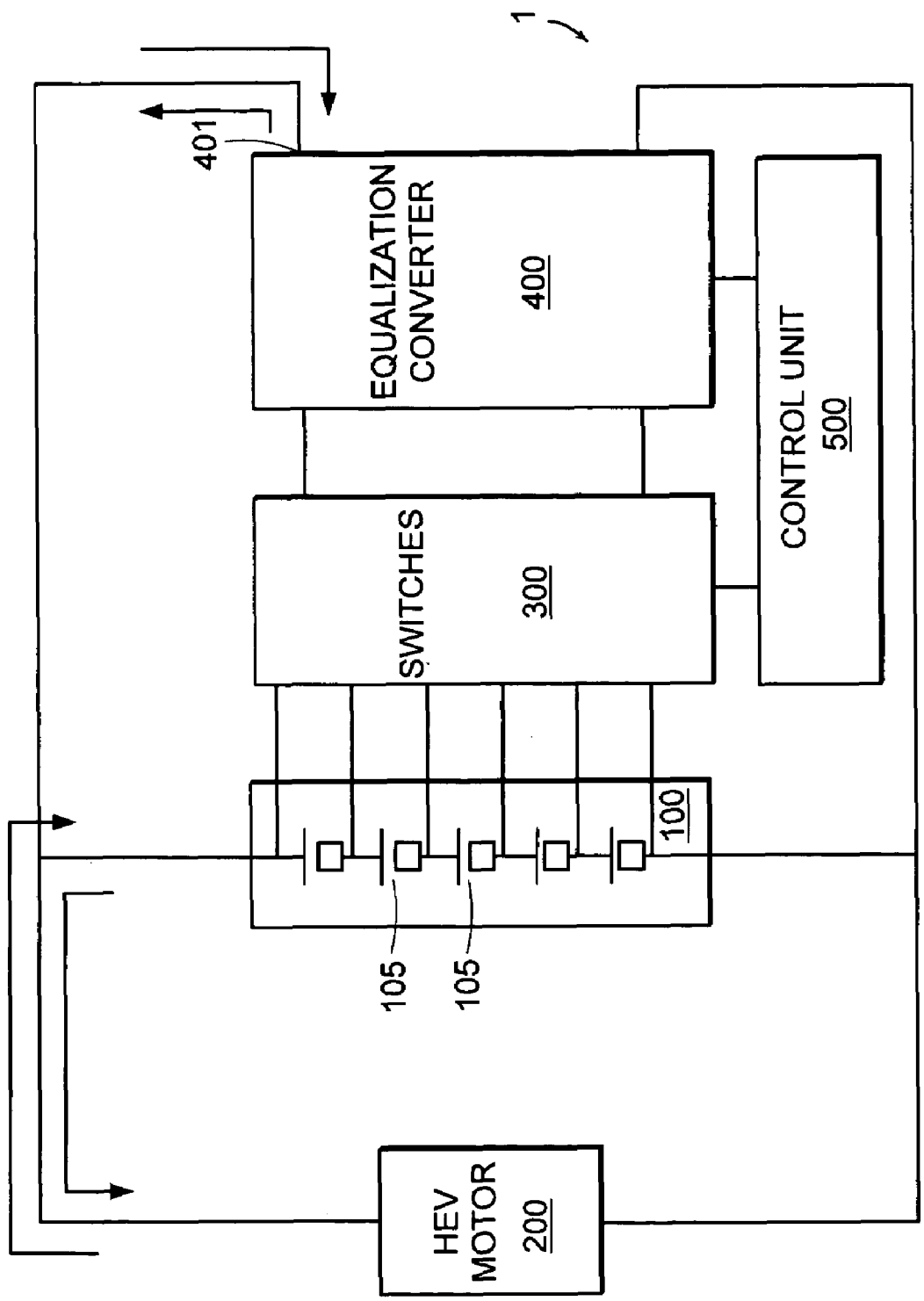
FIG. 1 is a diagram illustrating a cell balancing system according to one embodiment.

FIG. 1 is a diagram illustrating a cell balancing system according to one embodiment. The cell balancing system 1 includes a battery pack 100 that further includes a string of series-connected storage cells 105 for storing energy. The battery pack 100 serves as a source to power, for example, a Hybrid Electric Vehicle (HEV) motor 200. The battery pack 100 may also receive charge from the HEV motor 200 when it is driven as a generator either by the HEV engine or by vehicle kinetic and potential energy during braking operations.

The battery pack 100 is further coupled to a switch matrix 300, such that each of the storage cells 105 in the pack 100 may be individually selected and electrically coupled to an equalization converter 400 for monitoring of voltage, current, and temperature and for equalization of the individual cell state of charge toward a target state of charge. In particular embodiments, the switch matrix 300 may be an assembly of semiconductor switches, facilitating integrated circuit design and reduced fabrication costs.

A control unit 500 directs the switch matrix 300 in selectively coupling individual cells to the equalization converter 400 and monitors the state of charge of the individual cells 105 through communication with the equalization converter 400. According to one embodiment, the control unit 500 is a micro-controller with on-chip analog-to-digital converter (ADC) of modest resolution (e.g., 10 bits) and a conversion rate of, for example, 1000 per second. When the state of charge of an individual cell is different than a target state of charge, the control unit 500 directs the equalization converter 400 to transfer energy between the individual cell and the string of cells 100, such that the state of charge of the selected cell converges toward a target state of charge.

For example, when the state of charge of a selected cell is greater than the target, the cell is incrementally discharged by directing the equalization converter 400 to draw current from the cell and to return the charge back to the battery pack 100 via connection 401. Conversely, when the state of charge of the selected cell is less than the target, the cell is charged by directing the equalization converter 400 to draw current from the battery pack 100 via connection 401 and to deliver it to the selected cell. State of charge may be determined from a voltage measurement under a fixed load using a method depicted in FIGS. 7A–7D and subsequently described. In such embodiments, an individual cell may be charged or discharged in a non-dissipative manner.

According to alternative embodiments, the current drawn (i.e., discharged) from the selected cell may be transferred to another non-dissipative load. A load is non-dissipative if at least 80% of the energy through that element is conserved. A non-dissipative load can include an intermediate energy storage buffer (e.g., a capacitor or an auxiliary power supply) for subsequent charging of the string of cells or an individual cell. According to further alternative embodiments, the non-dissipative load may also include another storage cell. Additional switches and equalization converters may need to be incorporated for transferring energy to the other storage cell.

State of charge (SOC) is a measure that characterizes electrochemical states of a cell after a charging or discharging process. For example, assume that the full capacity of a cell is 'z' Ah (Ampere-hour). After discharging 0.5 z Ah capacity from the fully charged state, the state of charge of the cell is 50%. Likewise, after discharging 0.25 z Ah capacity from the fully charged state, the state of charge is 75% and so on.

The state of charge of a cell can be correlated to cell open circuit voltages through electrochemical titration of the cell. As an approximation, a cell's state of charge is often correlated to cell voltages through charging or discharging voltage profiles at very low charging or discharging rates. Since cell state of charge reflect the electrochemical state, it is important to equalize a cell's state of charge in order to enhance cell life and cell safety.

According to particular embodiments of the invention, the state of charge is measured by measurement of voltage, current, and impedance. The state of charge is equalized by correcting for the voltage difference that is due to the load and then comparing voltages of individual cells.

In prior art techniques, charge is measured and used as an indicator of cell equalization. However, charge, which is measured in Ampere-hour (Ah), is quite different from state of charge (SOC). It is not sufficient to only measure charge in order to equalize cells, because cells having the same charge may not have the same state of charge.

For example, assume two cells have a capacity of 20 Ah. When the cells are charged to 20 Ah, both have a 4.2V potential. Assuming that full cell capacity can be utilized, the cells can be equalized to a state of charge of 50% by equalizing the charge of the cells to 10 Ah, resulting in a certain voltage less than 4.2V.

However, assume further that the two cells degrade differently, such that the first cell can only achieve a maximum capacity of 18 Ah and the second cell can only achieve a maximum capacity of 15 Ah in their respective degraded state. When both cells are charged to their maximum capacities, both have a voltage potential of 4.2V. In this case, if the two cells are equalized to an equilibrium charge of 10 Ah, the first cell would be discharged by 8 Ah and the second cell would be discharged by 5 Ah. This results in the cells having different states of charge (i.e., 56% and 67% respectively), and thus two quite different cell voltages. Hence the cells are not considered equalized.

Therefore, the method of equalizing cell charge does not become reliable for the degraded cells or for cells that are not equivalent in nature. This inability to equalize state of charge leads to low battery life and safety hazards. The low life is caused by potential deep discharge or overcharging, resulting from the inability to determine state of charge. Further, and especially for lithium-ion batteries, the overcharge or over-discharge may cause thermal runaway due to possible formation of dendrites that can cause internal shortage of the cells.

According to particular embodiments of the invention, the impedance of a cell, and therefore the state of charge, can preferably be measured by employing a test current coming from or into the cell and measuring the voltage in response. The cell resistance is determined by dividing the measured cell voltage by the measured cell current. Additional information about the more complex cell impedance can be determined by measuring the resistance change over time in response to a constant current or a current profile.

The test current can be a controlled current that can be programmed by the controller to take a current sample from or supply a current sample to the cell in a non-dissipative manner via the converter. The test current can also employ the actual load current going into or out of the string of cells as the vehicle brakes or accelerates.

In the case of the controlled current, the amplitude and duration of the current pulse can be tailored to optimize the impedance measurement. In the case of a load current due to vehicle motion, the measurement of impedance may not be optimized, but it can occur during normal vehicle operation.

Both types of test current impedance measurement may be combined if necessary. For example, if the vehicle is drawing only a light load from the stack that is not sufficient to accurately measure the impedance of a particular cell, the converter may be programmed to draw just enough extra current from the cell to provide an accurate measurement.

For batteries, when determining internal impedance of the cell, the voltage and current are preferably measured during a fast pulse of the system. This impedance is only due to the so-called internal impedance and not due to other polarization effects in the battery. This is also the impedance that is used to calculate the voltage that corresponds to a certain state of charge, by correcting for the load applied to the battery during operation.

Figure 2:
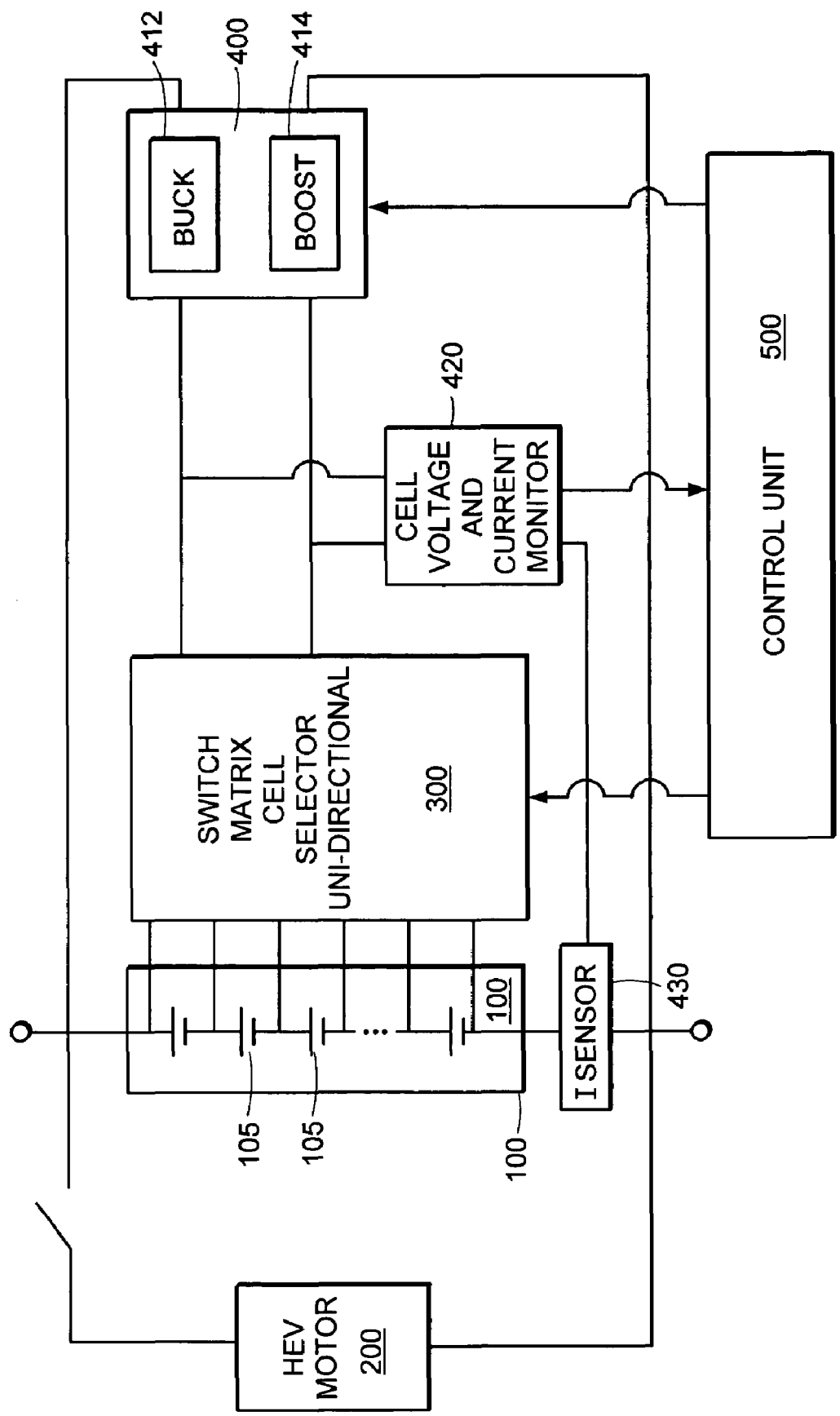
FIG. 2 is a more detailed diagram illustrating a cell balancing system according to one embodiment.
Figure 4A:
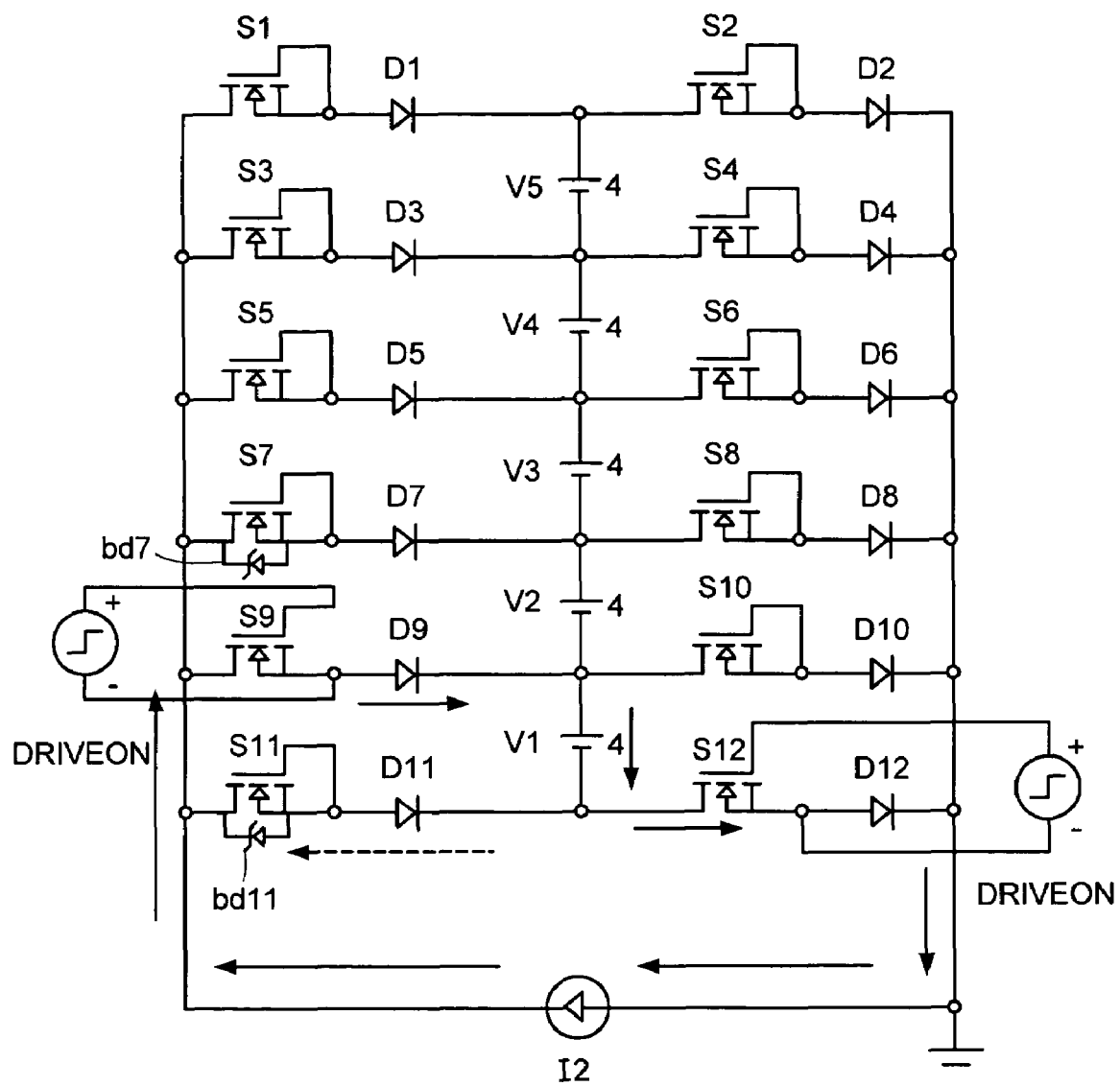
FIGS. 4A and 4B are schematic diagrams for illustrating the operation of the switch matrix having unidirectional switches.
Figure 4B:
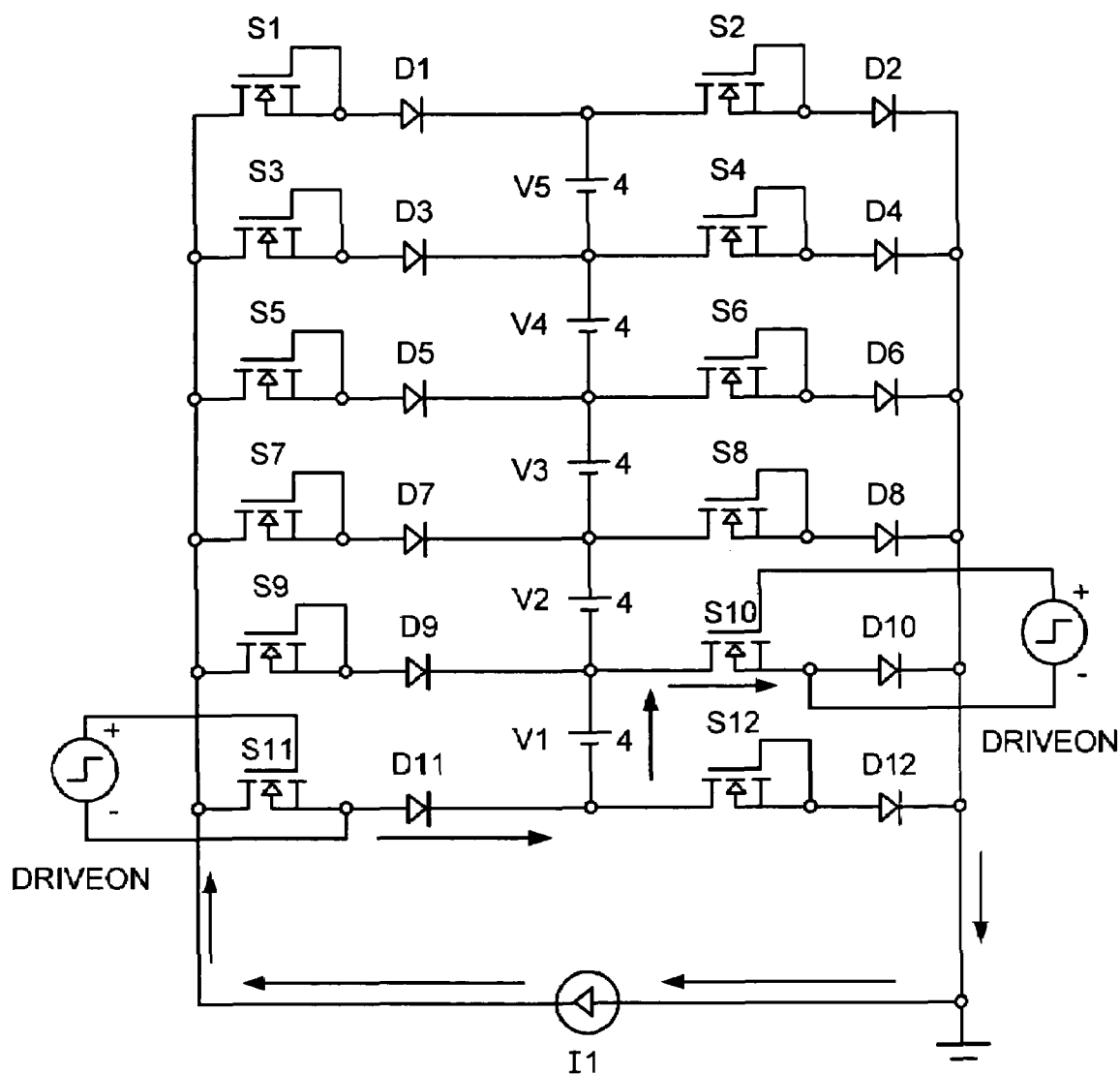

FIG. 2 is a more detailed diagram illustrating a cell balancing system according to one embodiment. In this embodiment the switch matrix 300 includes an assembly of 2(N+1) unidirectional switches (not shown) where N is the number of cells in the battery pack 100. In order to electronically couple an individual cell to, for example, the equalization converter 400, the control unit 500 energizes a pair of unidirectional switches that provides a conduction path between the converter 400 and an individual cell 105. In particular, a first selected pair of switches provides a conduction path for charging the cell and a second selected pair of switches provides a conduction path for monitoring and discharging the cell. Implementation of switch matrix 300 with unidirectional switches is depicted in FIGS. 4A and 4B and subsequently described.

The equalization convertor 400 is used to transfer energy between an individual cell and the string of cells 100 when the state of charge for the selected cell is different than the target state of change. The control unit 500 provides control signals directing the converter 400 to transfer energy into a selected cell from the string of cells 100 or to transfer energy out of the cell back into the string of cells 100. The control unit 500 also provides control signals for limiting current to and from the cell and for identifying a target state of charge (e.g., cell voltage).

The equalization converter 400 includes a buck converter 412, also referred to as a down converter. When the state of charge of an individual cell is less than a target state of charge, the control unit 500 directs the buck converter 412 to transfer energy from the string of cells to charge the individual cell.

According to one embodiment, the buck converter 412 may be a galvanically isolated buck converter circuit, which can accept charge from a pack of series-connected cells or a battery module of cells (e.g., a 400-volt battery pack of five 80-volt modules) and deliver it to a selected cell. The buck converter input voltage range can be matched to the maximum voltage produced by a string of cells in a battery module (e.g., 80 volts) or the entire battery pack itself (e.g., 400 volts). The buck converter output can be matched to the voltage of an individual cell. The converter output may also have its voltage and current limits programmable by the control unit 500.

The buck converter power rating may be determined by the maximum equalization charge current demand. For example, the peak power rating of a buck converter providing a maximum equalization charge current of 10 Amperes delivered at 4 Volts is 40 Watts, resulting in the size and cost of the circuit components being relatively small. The buck converter may also supply a small amount of control power necessary to operate cell monitoring and equalization control circuits.

Figure 8B:
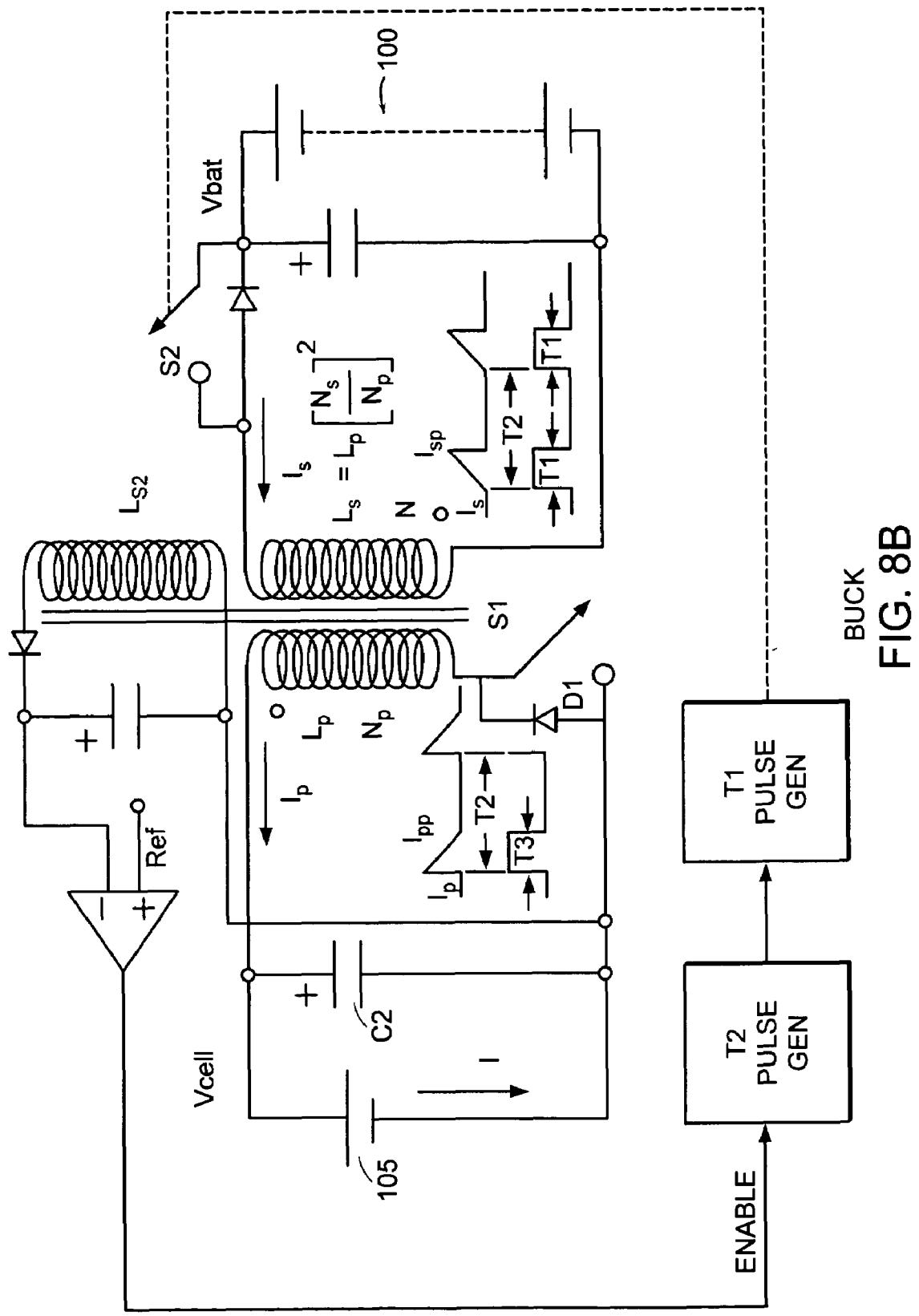
FIG. 8B is a schematic diagram illustrating the operation of a buck converter according to one embodiment.

In one particular embodiment, the buck converter is a Beta Dyne 40W Power Watt™ DC/DC Converter. In another particular embodiment, the buck converter is implemented as a combined buck/boost converter, which can be enabled to perform either function. A boost converter returns charge to the pack. The operation of a buck converter according to one embodiment is illustrated in FIG. 8B.

The equalization converter 400 further includes a boost equalization converter 414, also referred to as an up converter. When the state of charge of the individual cell is higher than the target state of charge, the control unit 500 directs the boost converter 414 to transfer energy from the selected cell to charge the string of cells 100.

According to one embodiment, the boost converter 414 may be a galvanically isolated boost converter circuit which can accept charge from a selected cell and return it to a pack of cells or a module of cells (e.g., a 400 volt battery pack employing five 80-volt modules). Its output provides a current source with adequate voltage to assure charge acceptance at the maximum desired rate over the operating voltage range of the pack or module to which it is connected.

The boost converter may have its output voltage limited to avoid over-voltage when disconnected. The boost converter may have its input voltage and current limits determined by the control unit 500. For example, the input may be configured to accept charge from the connected cell over the expected range of cell voltages. The size and cost of the circuit components of the boost converter may be similar to the buck converter. The operation of a boost converter according to one embodiment is illustrated in FIG. 8A.

The cell balancing system further includes a cell voltage and current monitor 420, and a current sensor 430. The cell voltage and current monitor 420 reports selected cell voltage and current to the control unit 500 for determining the state of charge of that cell. The cell voltage and current monitor 420 also observes battery current sensor 430. Cell voltage and current data is utilized by the control unit 500 for determining a target state of charge dynamically. When each of the individual states of charge of the cells converges toward the target state of charge, the charge will be equalized across the string of cells, facilitating longer operating and calendar life.

Figure 3A:
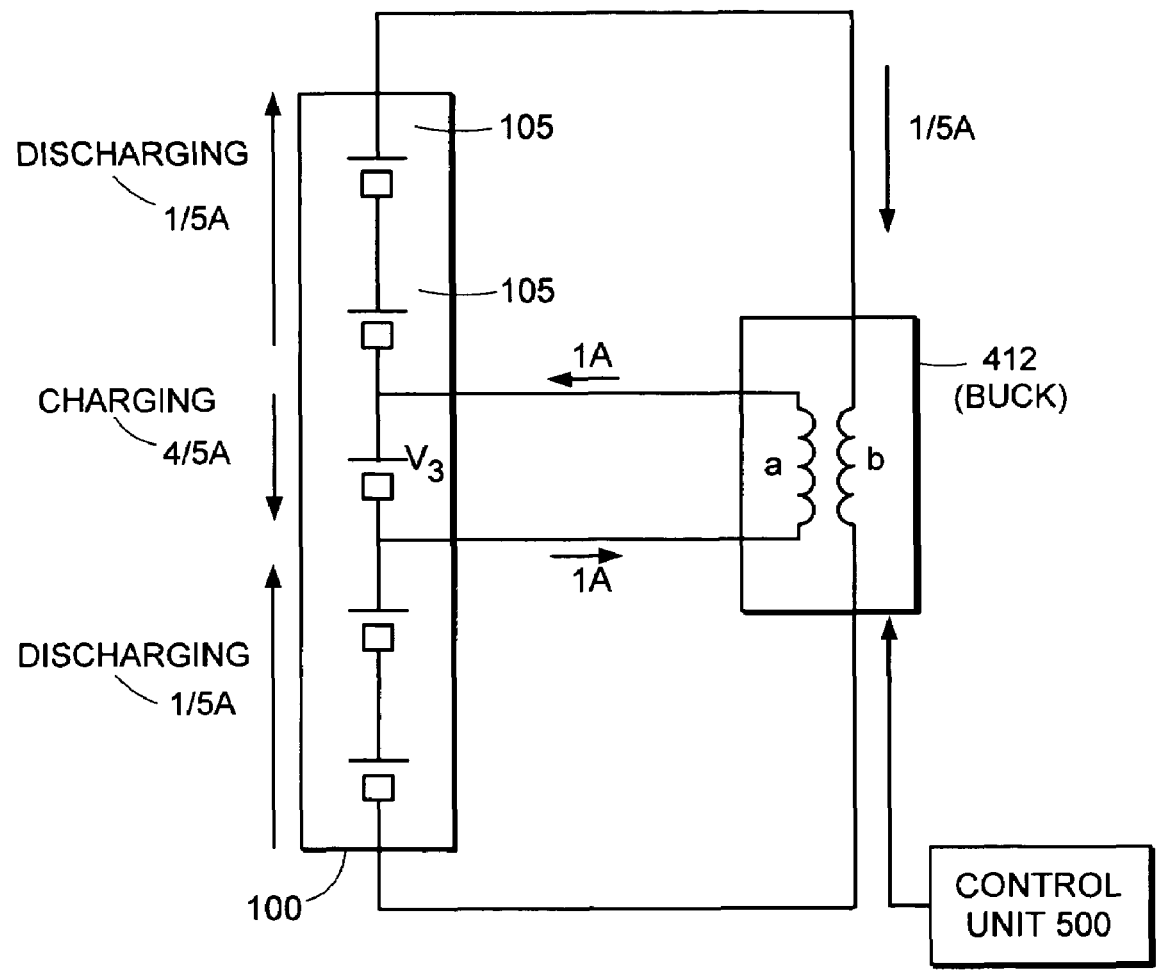
FIGS. 3A and 3B are conceptual diagrams for illustrating the bidirectional charging operation of the equalization converter according to one embodiment.
Figure 3B:
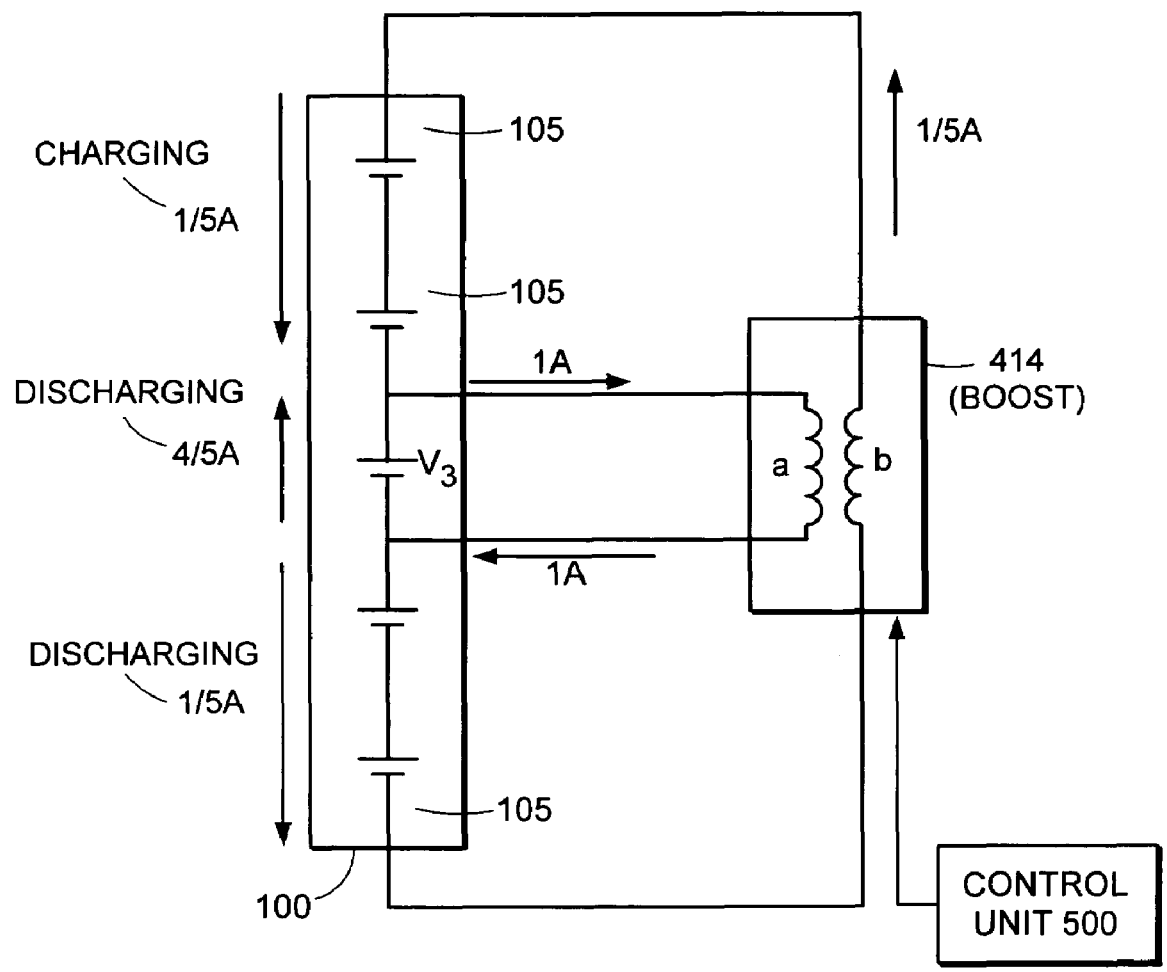

FIGS. 3A and 3B are conceptual diagrams for illustrating the bidirectional charging operation of the equalization converter according to one embodiment. At this conceptual level, attention is focused on the galvanic isolation provided by transformer coupling means (a,b) employed in the buck converter 412 and boost converter 414. Switch mode power supply circuitry required to interface the DC input and DC outputs with the transformer is assumed but not shown.

In FIG. 3A, when the buck converter 412 is directed by the control unit 500 to transfer energy into selected cell V3, current from the string of cells 100 is drawn through an inductor element "b," causing induced current to be driven from the buck converter 412 into selected cell V3 via inductor element "a." For example, in FIG. 3A, where there are 5 storage cells in the string, the voltage across the string of cells must be down converted to about the target voltage of the individual cell, or about ⅕ the string voltage. Assuming all cells have about the same impedance and 1 A of induced current is driven into the selected cell from the buck converter 412, about ⅕ A will be drawn from the string. The resultant current through the cell being charged will then be approximately (1 A−⅕ A)=⅘ A of current for charging the selected cell, while ⅕ A of current is discharged from the remaining cells.

Conversely, in FIG. 3B, when the boost converter 414 is directed by the control unit 500 to transfer energy out of the selected cell V3, current from the selected cell is drawn through an inductor element "a," causing induced current to be driven from the boost converter 414 back into the string of cells 100 via inductor element "b." For example, in FIG. 3B, where there are 5 storage cells in the string and 1 A of induced current is drawn from the selected cell by the equalization discharge converter 414, ⅘ A of current (i.e., 1 A−⅕ A=⅘ A) is discharged from the selected cell, while ⅕ A of current is delivered to the remaining cells for charging.

FIGS. 4A and 4B are schematic diagrams for illustrating the operation of the switch matrix having unidirectional switches. The operation of the switch matrix permits a cell to be selectively charged or discharged and its voltage to be monitored. For embodiments of the cell balancing system, such as illustrated in FIG. 2, an assembly of N cells requires 2(N+1) independently controlled unidirectional switches S.

Although not so limited, in the illustrated embodiment the unidirectional switches are MOSFET switches S with each coupled to a blocking diode D. The unidirectional switches are arranged such that by energizing a pair of switches, a conduction path through the selected cell is maintained for monitoring and/or transferring energy in or out of the cell. Since switches S are unidirectional, one pair of switches may be enabled to selectively charge an individual cell and another pair of switches may be enabled to discharge or monitor the same cell.

For example, in FIG. 4A, it is possible to selectively charge an individual cell V1 by enabling unidirectional MOSFET switches S9 and S12. Current taken from a battery of cells via the buck converter 412, which is represented by controlled current source 12, flows from switch S9 and diode D9 through cell V1 and returns back to the switch matrix 300 by switch S12 and diode D12. In this example, blocking diodes D1 and D11 prevent cell V1 from being short circuited through the intrinsic body diodes of S10 and S11 while S9 and S12 are conducting. For example, the intrinsic body diode bd7 of switch S7 is shown in FIG. 4A. That diode allows conduction from right to left even when switch S7 is gated OFF. Such conduction would provide a short circuit from the positive node of V2, through the intrinsic body diode of S7 and the ON switch S9 if the diode D7 were not in place.

Similarly, in FIG. 4B, it is possible to discharge an individual cell V1 by enabling unidirectional MOSFET switches S11 and S10. Charge returning to the battery of cells via the boost converter 414, which is represented by a controlled current sink I1, flows from switch S11 and diode D11 through cell V1 and returns back to the switch matrix 300 by switch S10 and diode D10. Alternatively, I1 maybe a current limited voltage sink (i.e. one which permits cell discharge to a controllable potential).

As noted above, a diode in series with each unidirectional MOSFET switch is required to block undesired conduction paths. To provide minimal voltage drop across the blocking diodes, Shottky diodes may be used. Because the associated current is known, it is possible to compensate for the blocking voltage drop in charge, discharge, and measurement modes of operation. The residual non-systematic voltage drop after compensation is due to variations in diode properties among devices and cannot be compensated, but it is small relative to the operating voltages. This combined charge/discharge capability with a single controlled matrix provides the ability to transfer charge selectively among cells to provide for cell balancing.

According to particular embodiments, the unidirectional switches may also be insulated gate bipolar transistors (IGBT). However, MOSFET technology avoids the conduction loss associated with the IGBT saturation voltage drop (Vce sat). MOSFET switches provide low impedance when turned ON. In particular, the losses due to drop across the MOSFET "on-resistance" (RDS on) are relatively small and there is low MOSFET "on-resistance" variation among devices and with temperature variation, providing an acceptable level of error in all voltage measurements through the matrix.

Isolated gate drives of the MOSFET switches may facilitate implementation in the form of an application specific integrated circuit (ASIC). According to one embodiment, the gate drivers are galvanically isolated light emitting diode (LED) driven photovoltaic (PV) gate drivers. The modest turn-ON/turn-OFF speeds achieved by these drivers are more than adequate for the intended application.

Figure 5:
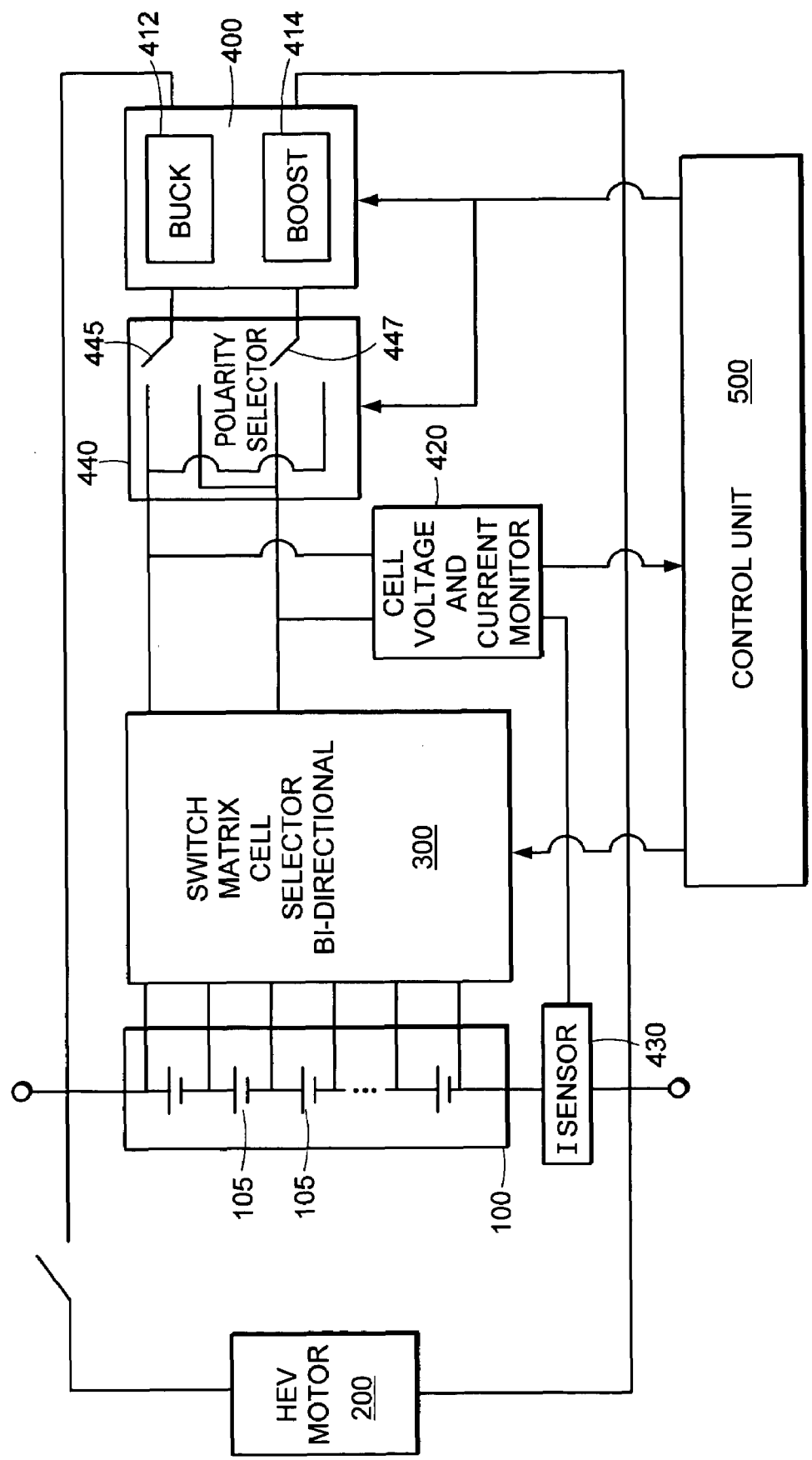
FIG. 5 is a more detailed diagram illustrating a cell balancing system according to an alternative embodiment.

FIG. 5 is a more detailed diagram illustrating a cell balancing system according to an alternative embodiment. This embodiment is substantially similar in operation to that of FIG. 2 with the exception of the configuration and operation of switch matrix 300 and the additional polarity selector 440 that is controlled by control unit 500. The polarity selector 440 is coupled between the switch matrix 300 and the equalization converter 400.

In particular, the switch matrix 300 includes a bank of N+1 bidirectional switches (not shown) where N is the number of cells in the battery pack 100. In order to electronically couple an individual cell to, for example, the equalization converter 400, the control unit 500 energizes a pair of bidirectional switches that provides a conduction path between the converter 400 and the cell. One pair of switches may be used to selectively charge or discharge an individual cell.

The control unit 500 determines whether to charge or discharge the cell based on whether the state of charge of the selected cell is greater or less than a target state of charge. When the state of charge is greater, the control unit 500 sends a signal to the equalization converter 400 to discharge the cell. At the same time, the control unit 500 also sends a control message to the polarity selector 440 to select the polarity of links 445 and 447 which are coupled to the switch matrix 300, as discussed in FIG. 6A. The polarity selector may be implemented with MOSFET switches and galvanically isolated LED-PV gate drivers or electromechanical relays. Other implementations of the polarity selector known to those skilled in the art may suffice.

Figure 6A:
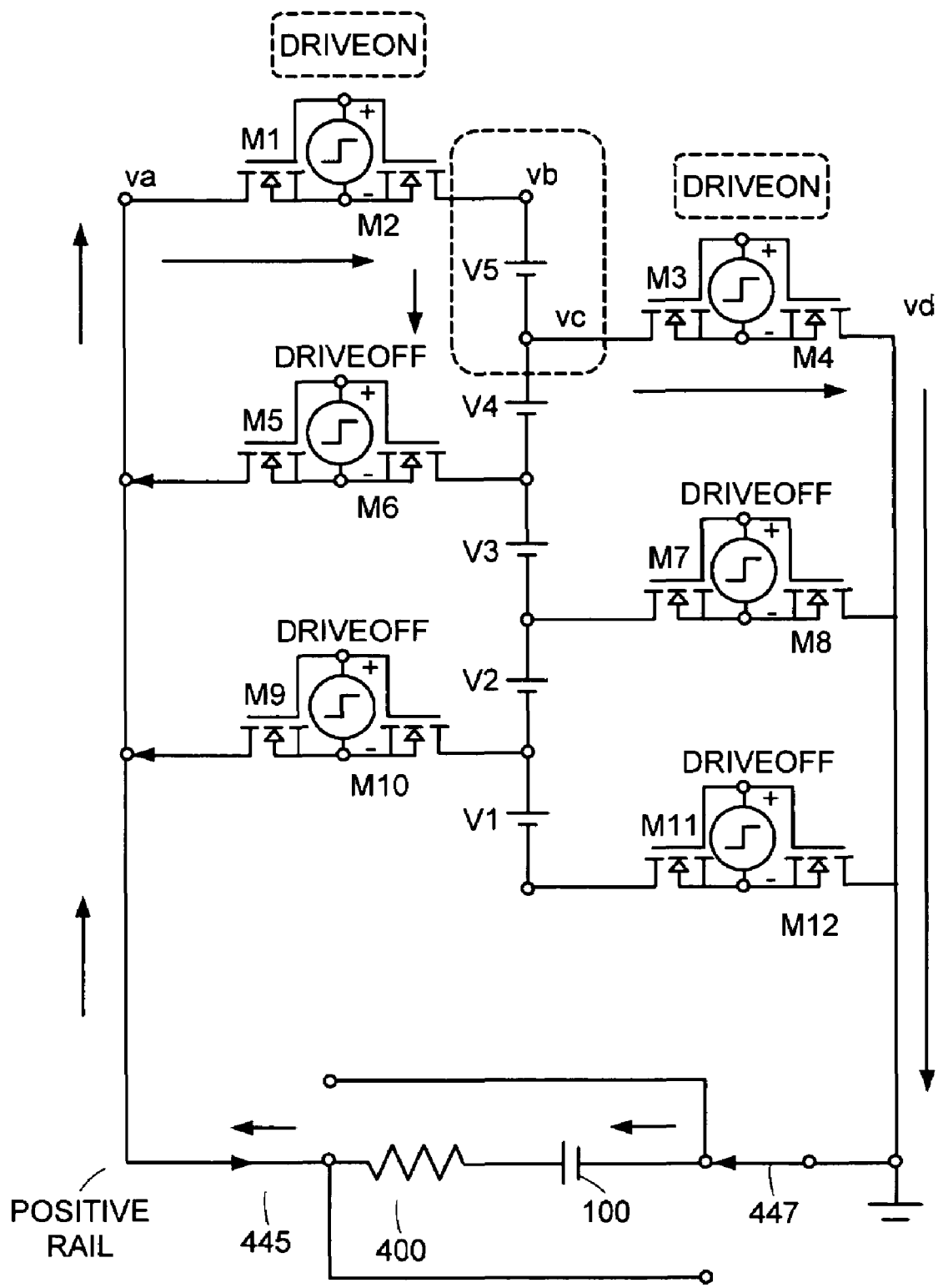
FIGS. 6A and 6B are schematic diagrams for illustrating the operation of the switch matrix having bidirectional switches according to one embodiment.
Figure 6B:
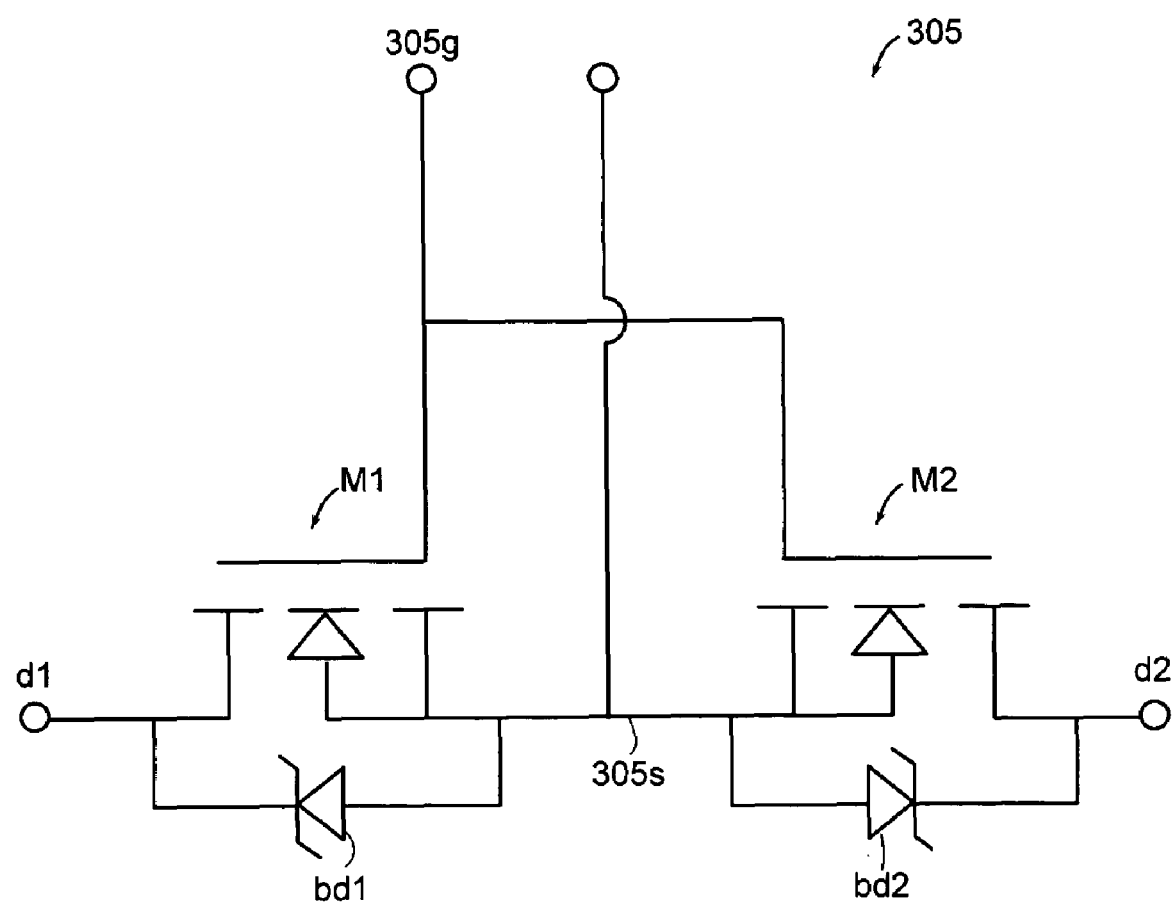

FIGS. 6A and 6B are schematic diagrams for illustrating the operation of the switch matrix having bidirectional switches according to one embodiment. The operation of the switch matrix permits a cell to be selectively charged or discharged and its voltage to be monitored. Note that for this embodiment, a pair of unidirectional MOSFETs connected "back-to-back" comprises a single bidirectional switch. This will be explained in detail in FIG. 6B.

For embodiments of the cell balancing system, such as illustrated in FIG. 5, an assembly of N cells requires (N+1) independently controlled bidirectional switches. Thus, the number of switching components is reduced from implementations that utilize unidirectional switches. This reduction also corresponds to a reduction in the number of gate drivers that are required. The bidirectional switches are arranged such that by energizing a pair of switches, a conduction path through the selected cell is maintained for monitoring and/or transferring energy in or out of the cell.

Since switches are bidirectional, a single pair of switches may be enabled to both charge or discharge an individual cell. For example, in FIG. 6A it is possible to selectively charge cell V5 by enabling switch M1/M2 and switch M3/M4. To charge the cell, the equalization converter 400 causes current to flow in a direction from switch M1/M2, charging cell V5 and exiting through switch M3/M4 back to the cell balancing circuitry. In particular, the internal resistance of the equalization circuit 400 is represented by a resistor and the string of cells 100 is represented by a battery symbol.

Similarly, in order to selectively charge cell V4, switches M5/M6 and M3/M4 must be enabled. However, in order to drive current from the equalization converter 400 into cell V4 for charging, the polarity across the pair of switches must be reversed. The polarity is set by the control unit 500 sending control signals to the polarity selector 440 to set the polarity across links 445 and 447. The selection of polarity is based, for example, on the particular arrangement of the bidirectional switches coupling to the individual cells. Other arrangements of bidirectional switches may be implemented avoiding the need for the polarity selector.

It is also possible to selectively discharge cell V5 by enabling the same bidirectional switches M1/M2 and M3/M4 that were enabled to charge the cell. To discharge the cell, the equalization converter 400 causes current to flow in an opposite direction from M3/M4, discharging cell V5, and exiting through switch M1/M2 back to the cell balancing circuitry. The same polarity set for charging may be used for discharging.

However, in order to selectively discharge cell V4, switches M5/M6 and M3/M4 are enabled and the polarity across the pair of switches must be reversed. Thus, the equalization converter 400 is able to withdraw current from cell V4, such that current flows from switch M5/M6, discharging cell V4 and exiting through switch M3/M4 back to the cell balancing circuitry.

FIG. 6B is a schematic diagram of a bidirectional switch according to one embodiment. In this embodiment, the bidirectional switch 305 is a pair of discrete MOSFET switches (M1, M2) having a common gate 305g and source 305s. To turn on the bidirectional switch, a voltage is applied to the gate 305g. According to one embodiment, the gate is driven by galvanically isolated LED photovoltaic (PV) gate drivers. Current flows in a direction determined by the equalization converter 400 and the polarity applied at terminals d1 and d2 as applied by links 445 and 447 of the polarity selector 440.

With this configuration, a forward biased intrinsic body diode, bd1 or bd2, does not introduce a voltage drop to compromise cell voltage measurement accuracy because current flows principally through the channel of the associated MOSFET device and the voltage drop across its channel resistance is much lower than a diode drop, and thus dominant. Moreover, when the bidirectional switch gate drive is off (i.e., zero or close to zero volts), the MOSFET switch pair blocks conduction in both directions thus avoiding need for the blocking diodes required for the unidirectional switch embodiment depicted in FIG. 4A and FIG. 4B. Thus, the illustrated embodiment of the switch provides low voltage drop switching with lower power dissipation and high accuracy in cell voltage and state of charge estimation, due to lower contaminating voltage drops in the circuit.

According to particular embodiments, the bidirectional switches may be implemented with insulated gate bipolar transistor (IGBT) devices or electromechanical relays, or Semiconductor Assisted Relay Switches. IGBT switches do not have an intrinsic reverse diode and provide only unidirectional conduction. Hence, if parallel "back-to-back" IGBT switches are utilized to implement the bidirectional switch previously described, each IGBT switch must contain series blocking diodes to prevent reverse current.

While bidirectional IGBT switches are applied in power switching applications, the conducting IGBT and reverse diode introduce contaminating voltage drops which are highly undesired here. MOSFET switches provide low impedance when turned ON, and thus are generally preferred for this reason. However, where voltage and current rating requirements cannot be affordably met by MOSFET switches, IGBT embodiments may be viable provided that compensation for the IGBT and diode conduction voltage drops is provided.

If electromechanical relays can attain suitable cycle life and their size and weight are not objectionable, they too may be employed for implementing the cell selection switch matrix in lieu of MOSFET bidirectional switches, with the advantage of avoiding the need for LED-PV drive isolation and virtual elimination of conduction losses.

According to still further embodiments, the bidirectional switches may also be implemented with parallel-connected "back-to-back" silicon controlled rectifiers (SCRs).

Isolated gate drives of the MOSFET switches and the MOSFET switches themselves may facilitate implementation in the form of an application specific integrated circuit (ASIC). Moreover, more than one isolated gate drive bidirectional switch might be advantageously integrated in one ASIC chip. According to one embodiment, the gate drivers are galvanically isolated LED driven photovoltaic (PV) gate drivers. The modest turn ON, turn OFF speeds are more than adequate for the intended application.

Figure 7A:
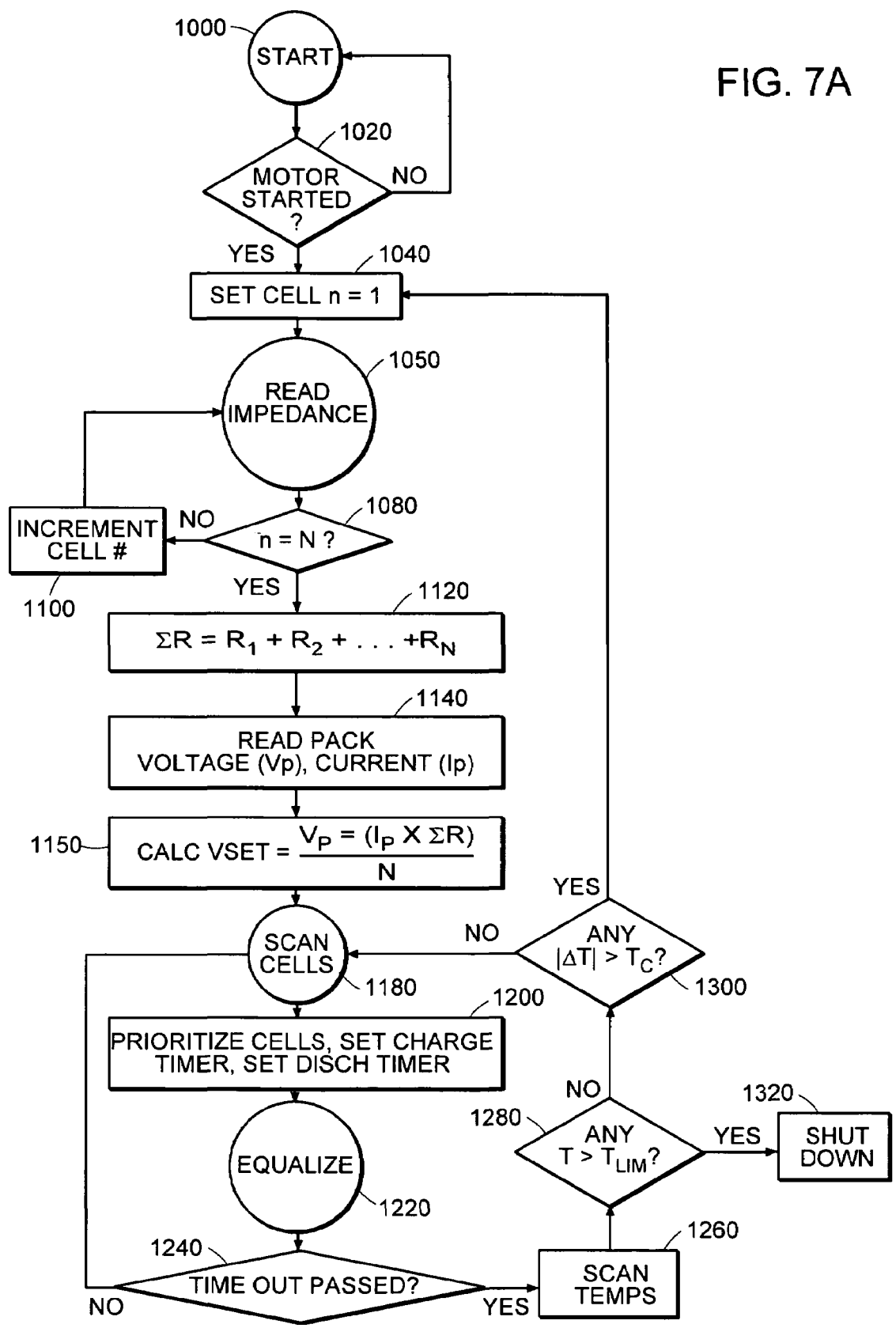
FIG. 7A-7D are flow charts illustrating a method of operating the cell balancing system according to one embodiment.

FIG. 7A-7D are flow charts illustrating a method of operating the cell balancing system according to one embodiment. Although not so limited, this method may be implemented as an algorithm that causes the control unit 500 to perform the following procedure. Referring to FIG. 7A, the process starts at 1000. At 1020, the status of the motor is checked. If the motor is off, the method returns to 1000 and waits to poll the motor status again. If the motor is started, a cell number n is initialized to 1 at 1040 to select the first cell of the battery pack 100. At 1060, the process calls subroutine "READ IMPEDANCE."

Figure 7B:
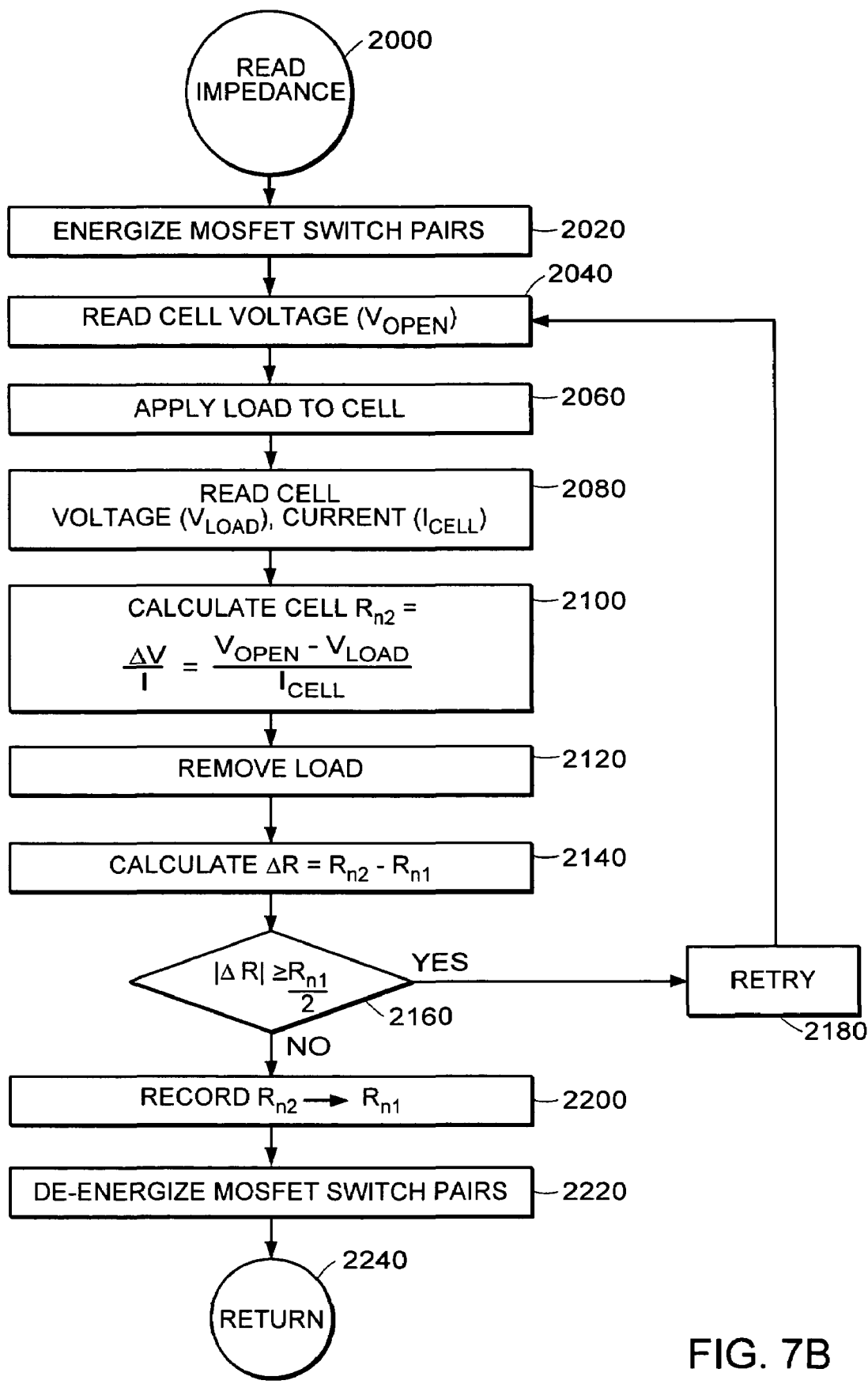

Referring to FIG. 7B at 2000, subroutine "READ IMPEDANCE" is started. At 2020 a pair of switches is energized, connecting the selected cell (i.e., cell n=1). At 2040, the open circuit voltage (Vopen) of the selected cell is read. At 2060, a load is applied to the selected cell, causing current to flow from the selected cell and the cell voltage to drop. The applied load may be the boost converter 414. By using the boost converter 414, energy from the cell is not lost, as compared with a dissipative load. Rather, the boost converter 414 recharges the battery 100 with the current discharged from the cell.

At 2080 the loaded voltage (Vload) and current (Icell) of the selected cell are read. At 2100 the impedance of the selected cell is calculated and stored in variable Rn2. The cell impedance Rn2 is calculated as a ratio of the voltage difference between the loaded voltage (Vload) and the open circuit voltage (Vopen) divided by the cell current (Icell). The previously saved cell impedance value is stored in variable Rn1.

Since cell impedance can vary due to the dynamic usage of the battery pack, the steps 2060 and 2080 may be repeated multiple times in order to obtain a more accurate determination of cell impedance. For example, according to one embodiment, the boost converter may be operated such that constant amplitude current pulses (i.e., DC pulses) are withdrawn from the cell at fixed or varied time intervals, as discussed in reference to FIG. 8A. Whenever a DC pulse is drawn from the cell, the loaded voltage may be measured, resulting in a number of loaded voltage measurements. Whenever a DC pulse is not being drawn from the cell, the open circuit voltage across the cell may be measured, resulting in a corresponding number of open circuit voltage measurements. The voltage difference between the open circuit voltage and the voltage under load is referred to as a voltage ripple. From the voltage ripples and corresponding current pulses obtained over a period of time, a more accurate cell impedance may be inferred. The resulting cell impedance value may then be stored in variable Rn2.

According to a further embodiment, the applied load may be a buck converter operated such that constant amplitude current pulses (i.e., DC pulses) can be inserted into the cell at fixed or varied time intervals to infer cell impedance in a similar manner.

At 2120 the applied load is removed. At 2140 the change in cell impedance (ΔR) between the present and previous cell impedance values (Rn2, Rn1) is calculated. At 2160 it is determined whether the present value Rn2 has changed by 50% or more from the previous value Rn1. If so, a RETRY command is issued at 2180 causing the process to loop back to 2040 to recalculate the present cell impedance Rn2. If not, the previous impedance value Rn1 is replaced with the present value Rn2 at 2200. At 2220 the selected pair of switches is de-energized, decoupling the selected cell from the cell balancing circuitry. At 2240, subroutine "READ IMPEDANCE" returns.

Referring back to FIG. 7A at 1080, the cell number 'n' is compared with the total number of cells N in the pack to determine whether all of the present cell impedances have been determined. If not, the cell number 'n' is incremented at 1100 and subroutine "READ IMPEDANCE" is repeated until all of the present cell impedances R1, ... RN have been determined.

At 1120 the sum of the present cell impedance values ΣR is calculated. At 1140 the pack voltage, Vp, and pack current, Ip are read. The pack current is measured by current sensor 430 and saved. At 1160 a setpoint voltage Vset is calculated by averaging the pack voltage Vp, offset by the product of the pack current Ip and the sum of the cell impedances ΣR, over the total number of cells N. In particular, the pack current Ip has a positive value when pack current enters the pack. Conversely, the pack current Ip has a negative value when pack current exits the pack. The set point voltage Vset is referred to as the target state of charge. At 1180, subroutine "SCAN CELLS" is called.

Figure 7C:
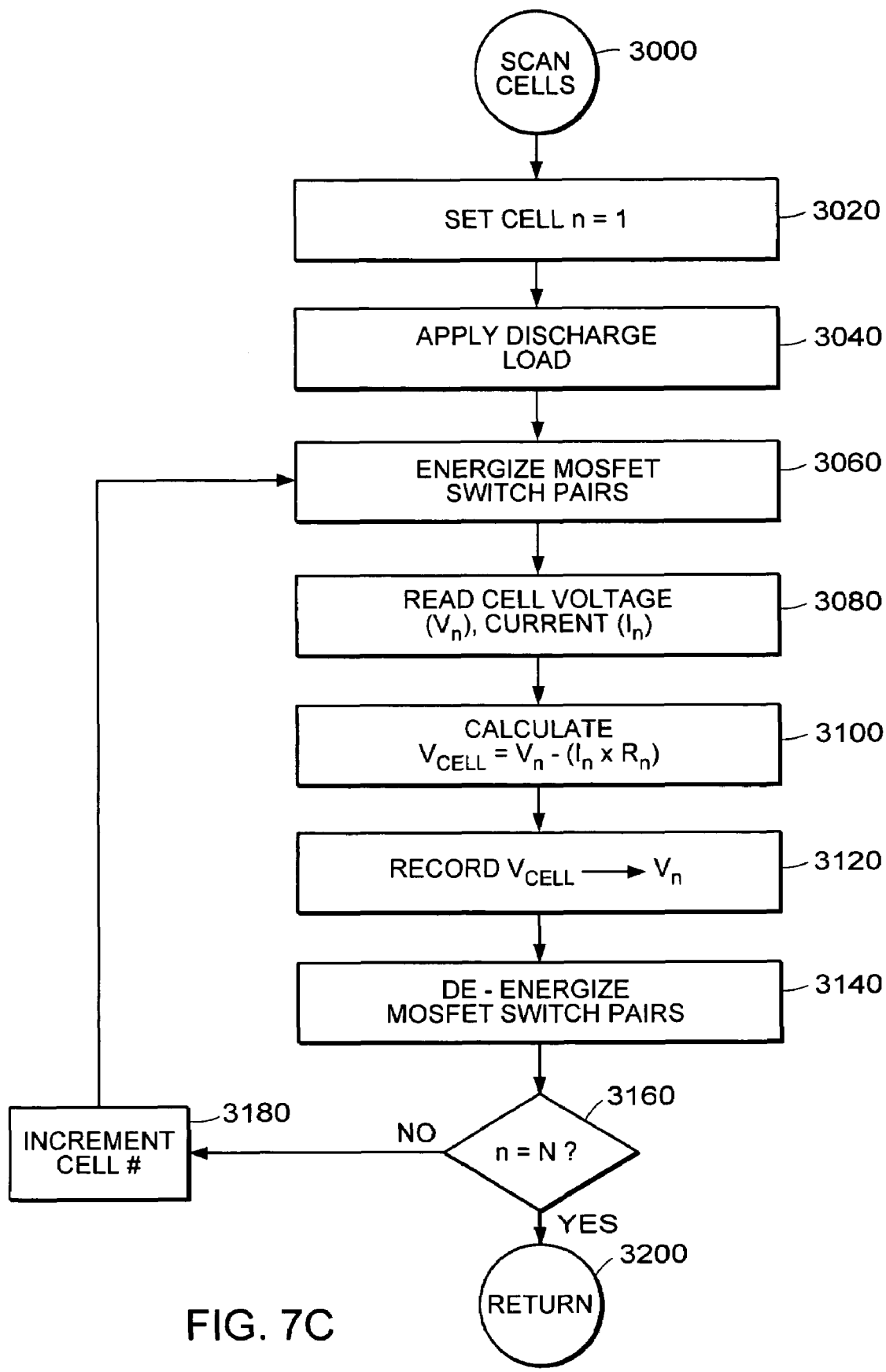

Referring to FIG. 7C, at 3000 subroutine "SCAN CELLS" is started. At 3020 the cell number 'n' is initialized to 1 to select the first cell in the pack. At 3040, a load is applied to the circuit. The applied load may be the boost converter 414. At 3060 a pair of switches is energized, connecting the selected cell to boost converter 414. Current flows from the selected cell and the cell voltage drops. At 3080 the loaded voltage Vn and cell current In are read. At 3100 the state of charge of the selected cell is calculated. According to one embodiment, the state of charge Vcell is the difference between the loaded voltage Vn and the product of the cell current In and the present cell impedance Rn. In particular, where the applied load (e.g., boost converter) draws current out of the cell, the cell current In has a negative value. Conversely, where the applied load (e.g., buck converter) draws current into the cell, the cell current In has a positive value. At 3120, the state of charge Vcell is stored in variable Vn.

At 3140 the selected pair of switches is de-energized, decoupling the selected cell from the boost converter 414. At 3160 the cell number 'n' is compared with the total number of cells N in the pack to determine whether the state of charge Vcell has been calculated for each cell in the pack. If not, the cell number 'n' is incremented at 3180 and a next pair of switches is energized to electrically couple the next selected cell. This is repeated until all the individual cells have been analyzed. At 3200, subroutine "SCAN CELLS" returns.

Referring back to FIG. 7A, at 1200 the individual cells are prioritized for equalization based on the difference between their state of charge Vcell and the target state of charge Vset. According to one embodiment, the individual cells are sorted for equalization with the individual cell having the largest difference being selected first. Additionally, the amounts of time for charging a cell or returning charge to the pack may be proportioned according to the amount of this difference. According to another embodiment, the individual cells are accessed sequentially for equalization. At 1220 subroutine "EQUALIZE" is called.

Figure 7D:
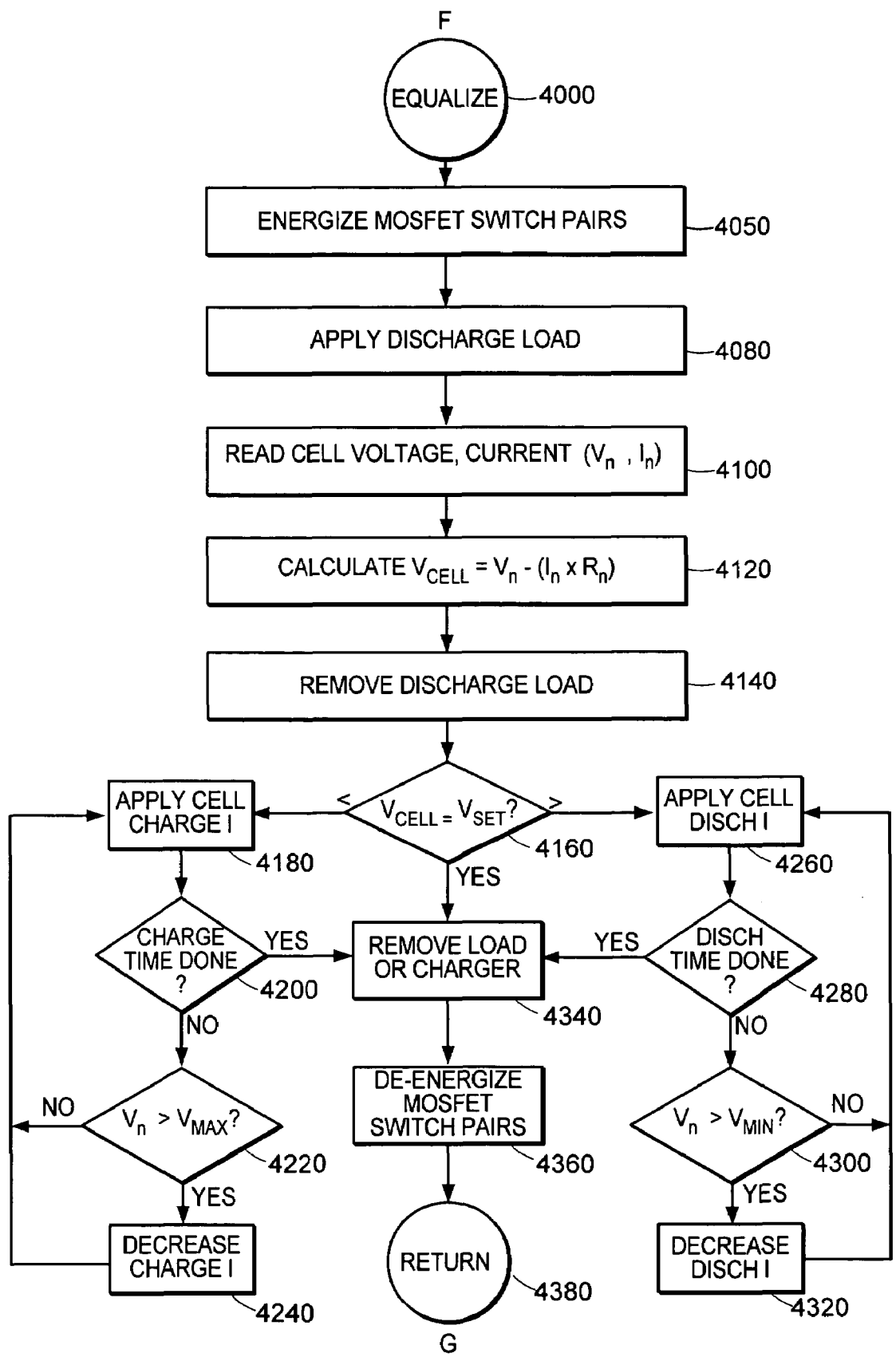

Referring to FIG. 7D, at 4000 subroutine "EQUALIZE" is started. At 4060 a pair of switches is energized, connecting the selected cell with the highest priority. At 4080 a load is applied to the selected cell, causing current to flow from the selected cell and the cell voltage to drop. The applied load may be the boost converter 414. At 4000 the loaded cell voltage Vn and cell current In are read. At 4120 the state of charge Vcell of the selected cell is calculated. According to one embodiment, the state of charge Vcell is the difference between the loaded voltage Vn and the product of the cell current In and the present cell impedance Rn. In particular, where the applied load (e.g., boost converter) draws current out of the cell, the cell current In has a negative value. Conversely, where the applied load (e.g., buck converter) draws current into the cell, the cell current In has a positive value. After calculating the state of charge Vcell, the applied load is removed at 4140. At 4160 the state of charge Vcell of the selected cell is compared with the target state of charge Vset.

If the state of charge Vcell is less than target state of charge Vset, the buck converter 412 is applied to the selected cell at 4180. At 4200 the charge time is monitored as determined by prioritization, and the applied voltage is monitored at 4220. If the charge time expires, the equalization charger circuit is removed at 4340. If the charge time has not expired, but the voltage from the buck converter that is applied to the selected cell is too high, the charging voltage is decreased at 4240.

If the state of charge (Vcell) is greater than target state of charge (Vset), the boost converter 414 is applied to the selected cell at 4260. At 4280 the discharge time is monitored as determined by prioritization, and the applied voltage is monitored at 4300. If the discharge time expires, the boost converter 414 is removed at 4340. If the discharge time has not expired, but the voltage being applied from the selected cell to the input of the boost converter is too low, the discharge current is decreased at 4240.

If the state of charge Vcell is equal to target state of charge Vset, within a pre-established deadband, the equalization converter 400 is removed from the selected cell at 4340. At 4360 the selected pair of switches is de-energized, decoupling the selected cell from the cell balancing circuitry. At 4380 subroutine "EQUALIZE" returns.

Referring back to FIG. 7A, at 1240 the equalize time is compared with a pre-determined interval (e.g. 5 minutes). If the equalize time does not exceed the pre-determined interval, the routine loops back to 1180 to repeat subroutine "SCAN CELLS" in preparation for another equalization. If the pre-determined interval has been exceeded, the temperatures of the individual cells are scanned at 1260. At 1280 each of the scanned temperatures T is compared to a pre-established high temperature limit, Tlim. If any of the scanned temperatures T is greater than temperature limit Tlim, the system is shut down at 1320. If not, a determination is made at 1300 whether the temperature of any cell has changed (|ΔT|) by more than a prescribed increment Tc (e.g., 5 degrees Celsius). If not, the routine loops back to 1180 to repeat subroutine "SCAN CELLS" in preparation for another equalization. If so, the routine loops back to 1040, resetting the cell number to 1 and repeating the process at subroutine "READ IMPEDANCE".

Embodiments of the equalization converter 400 may include separate or integrated buck and boost power converters to monitor the condition of an individual, selectable, cell in a series string of cells. Such embodiments also achieve desired cell equalization, such as charging an individual cell from the series string (buck mode) or transferring excess energy from an overcharged cell to the series string (boost mode). In particular, charge may be added or subtracted from an individual cell in a non-dissipative manner.

With respect to monitoring in general, testing of cell state of charge involves measuring temperature, open circuit voltage, and voltage under a fixed load for a certain period of time. Typically, the load current used is a discharge current into a resistive load, resulting in wasted energy (i.e., dissipation). If a conventional dissipative load is applied to a cell, it is normal to keep the measurement time as short as possible to avoid discharging the cell.

Embodiments of the equalization converter can be used in a cell balancing system to make the necessary measurements of open circuit voltage and voltage under load, as well as the change of these voltages over time, in a non-dissipative manner by monitoring the amplitude of the voltage ripple across the cell while transferring energy in either a positive (charge) or negative (discharge) mode without wasting energy. This non-dissipative technique has the advantage of extending this measurement time indefinitely, since it is occurring as part of the normal cell balancing process.

In particular, the equalization converter withdraws or inserts constant amplitude current pulses into a cell. In the time interval between these pulses, the open circuit voltage is present and measured. At the peak of the current pulses, the internal resistance of the cell affects the voltage in a positive or negative way depending on the direction of the current. The difference between the open circuit voltage and the voltage under load is the ripple. From multiple determinations of the voltage ripple, a more accurate cell impedance can be inferred. The length of time these current pulses are applied is the charge or discharge time.

In addition, low resistance bi-directional cell selector switches that connect the equalization converter to an individual cell are essentially lossless connections for monitoring the ripple across the cell.

With respect to equalization of cell state of charge, the equalization converter 400 removes energy in integer "packets" from an individual cell in a series string of storage cells (e.g., lithium ion cells) and transfers that energy to the series string as a whole or vice versa. The rate of transfer of these packets represents the power being transferred. A timer produces a packet by charging the primary side of an inductor/transformer for a period of time T1. A second timer controls the number of these packets produced per second at a rate of 1/T2. Immediately following the period T1, the energy is transferred to the battery string via the discharge of the energy stored in the inductor/transformer. The primary and secondary of the converter are electrically isolated so that the primary can be switched to any arbitrary cell. The size of the energy packet is controlled by varying T1, and the power by varying the time T2.

FIG. 8A is a schematic diagram illustrating the operation of a boost converter according to one embodiment. In particular, the boost converter enhances monitoring of the state of charge within a cell by withdrawing fixed amplitude current pulses from the cell and observing the resultant voltage "ripple." The amplitude of the resulting ripple voltage can be used to infer the impedance of the cell. This technique provides a more accurate indication of state of charge than the average cell voltage taken alone. The current pulses are "up-converted" to a higher voltage and returned to the series string with only negligible losses. This approach is an improvement over prior art equalization methods that place a dissipative load on selected cells, thus wasting their energy.

In more detail, a pulse generator T1 generates pulses of fixed length T1, that are used to close switch S1 connecting the cell to the inductor Lp. Current from the cell then charges the inductor (Lp) with a triangular shaped current ramp reaching a peak current (Ipp) of:

$$Ipp = V\text{cell} * Lp/T1$$

The resulting pulse of energy (Ep) is stored in the magnetic field of the inductor. The pulse energy is: $Ep = \frac{1}{2} Lp * Ipp^2$.

When pulse T1 transitions low, switch S1 is turned off and the magnetic field collapses. This causes the energy to discharge into the transformer secondary Ls. The peak current in the secondary winding (Ips), assuming negligible losses, is:

$$Ips = (2 * V\text{bat}/Ls)^{\frac{1}{2}}$$

This secondary peak current discharges into the output capacitor C1 in time T3, where:

$$T3 = (V\text{bat} * Ls)/Ips$$

It follows that the power output is proportional to the number of T1 pulses per second, or 1/T2. When the secondary voltage across inductor Ls2 reaches a voltage determined by the voltage reference (Ref), the pulse generator T2 stops generating T1 pulses since the Enable signal is removed from the pulse generator T2. Ideally, the second secondary has the same number of turns as the first secondary Ls and therefore reflects the secondary voltage across the isolation barrier.

FIG. 8B is a schematic diagram illustrating the operation of a buck converter according to one embodiment. In particular, current is drawn from the battery stack 100 and delivered to an individually selected cell 105. By adding switch S2 on the secondary side and diode D1 on the primary side of the circuit in FIG. 8A completes the conversion to a buck converter. Not shown in FIG. 8B is isolation circuitry to drive switch S2 across the isolation barrier. Additionally, minor adjustments to the voltage regulator and timer portions may also be necessary.

As shown, a pulse generator T1 generates pulses of fixed length T1 that are used to close switch S2 connecting the string of cells to the inductor Ls. Current from the string then charges the inductor (Ls) with a triangular shaped current ramp reaching a peak current (Isp). The resulting pulse of energy (Ep) is stored in the magnetic field of the inductor Ls.

When pulse T1 transitions low, switch S1 is turned off and the magnetic field collapses. This causes the energy to discharge into the inductor Lp. This secondary peak current discharges into the output capacitor C1 in time T3. It follows that the power output is proportional to the number of T1 pulses per second, or 1/T2.

When the voltage across inductor Ls2 reaches a voltage determined by the voltage reference (Ref), the pulse generator T2 stops generating T1 pulses since the Enable signal is removed from the pulse generator T2. Ideally, inductor Ls2 has the same number of turns as inductor Ls and therefore reflects the voltage across the isolation barrier.

Both diodes D1 and the secondary rectifier diode can be considered part of the switches S1 and S2, as they are the bulk substrate "intrinsic" diodes of N-channel FETS. These intrinsic diodes are now available in their companion FETS as high speed diodes and improve the switching efficiency of the circuit. If the Boost circuit is built with an N channel FET as the rectifier on the secondary side, then no additional power components are needed to convert it to a buck circuit with associated savings in space and parts cost.

Figure 9:
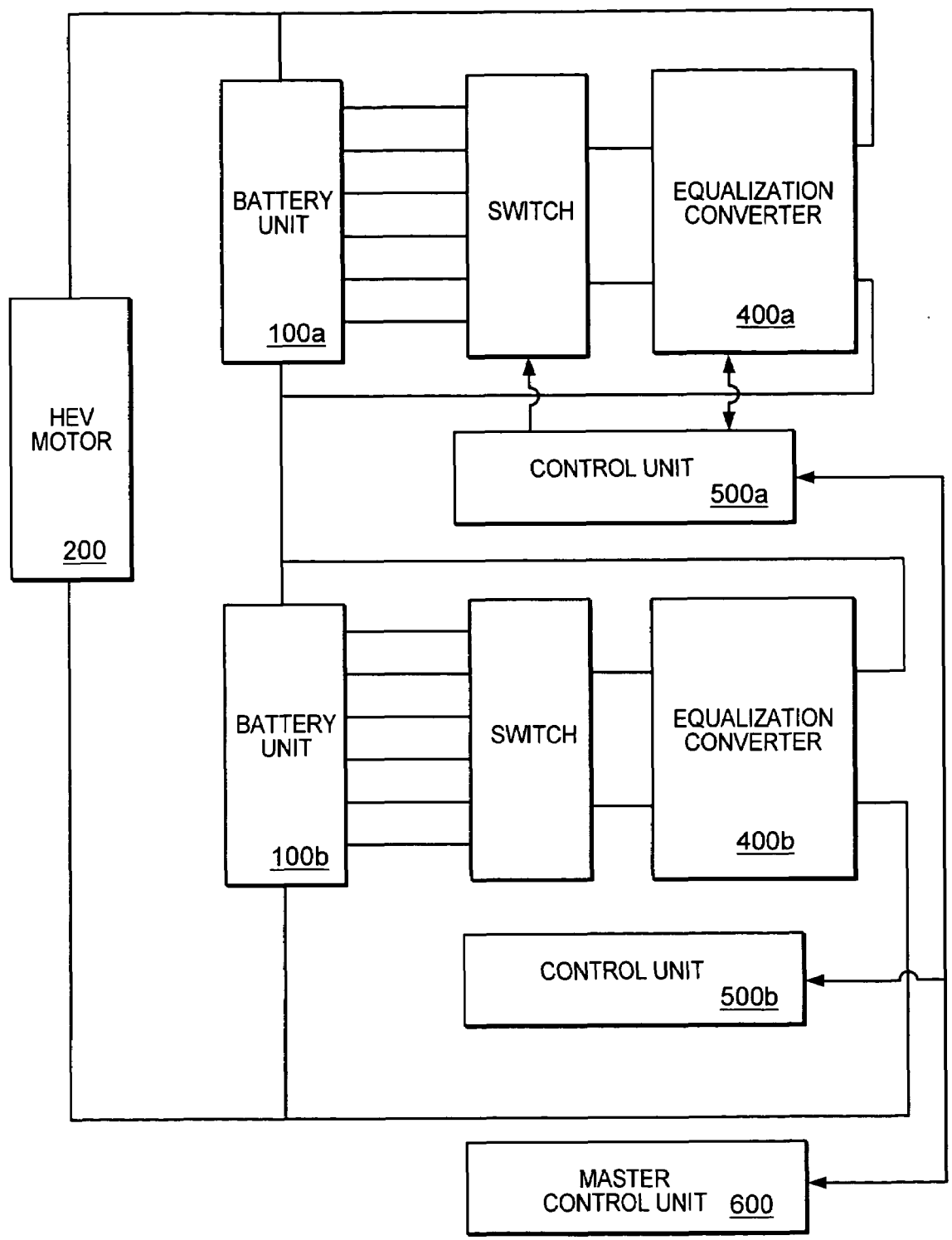
FIG. 9 is a diagram of a cell balancing system having reduced switch blocking requirements according to one embodiment.

FIG. 9 is a diagram of a cell balancing system having reduced switch blocking voltage requirements according to one embodiment. Due to the modular nature of embodiments of the cell balancing circuitry, the maximum voltage accommodated by the switch matrix switching devices may be limited to attainable and affordable ratings by connecting multiple cell balancing circuits in series, providing one for each module of cells constituting the HEV battery pack.

In this embodiment, multiple battery module units, or modules, 100*a*, 100*b* form the battery pack 100 having a total voltage potential Vp. Each battery module is coupled to a respective equalization converter 400a, 400b by a corresponding switch matrix 300a, 300b. The equalization coverters 400a, 400b are coupled in series, such that each converter is coupled across the terminals of a corresponding battery module 100a, 100b. This configuration reduces the switch blocking voltage requirement to Vp/M where M is the number of battery modules connected in series. In the illustrated embodiment, there are M=2 modules, resulting in each unit balancing the state of charge of a string of cells of the respective battery module 100a, 100b with the switch blocking voltage requirement reduced in half. By reducing the switch blocking voltage, cost benefits exist due to the ability to use lower voltage rated switch components.

A master control unit 600 directs local control units 500a, 500b in selectively monitoring and equalizing (i.e. charging and discharging) individual cells of the battery modules 100a, 100b as previously described. The master control unit 600 and the control units 500a, 500b may communicate over a galvanically isolated serial data communication link. In particular, the master control unit 600 broadcasts pack current and equalization setpoint values (i.e., target state of charge) to the local control units 500a, 500b. Likewise, the local control units may communicate diagnostic or prognostic status information to the master control unit 600, such as voltage, current, and temperature, from the modules.

Figure 10:
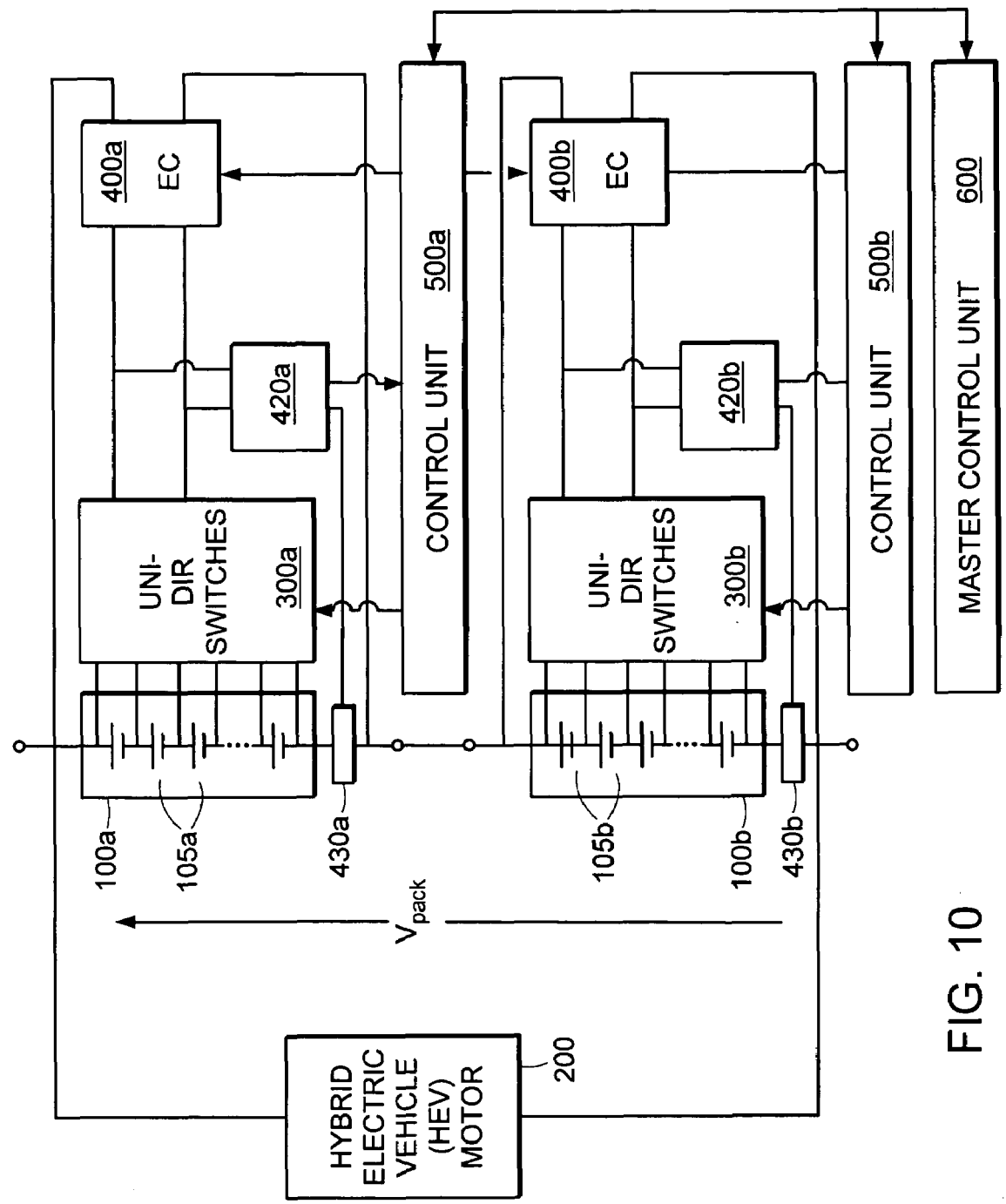
FIGS. 10 and 11 illustrate particular embodiments for reducing switch voltage blocking requirements utilizing the unidirectional and bidirectional switch matrix configurations respectively.
Figure 11:
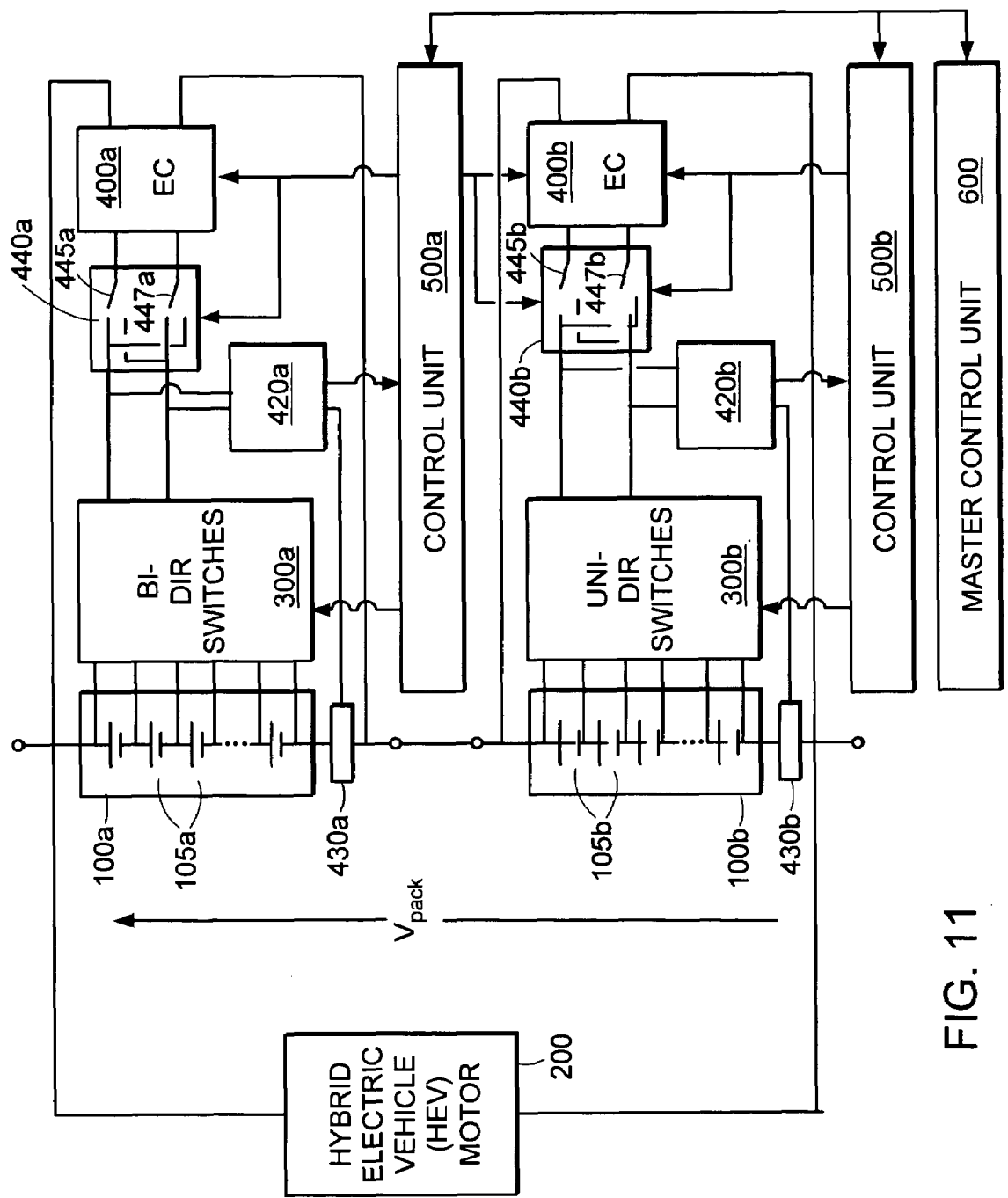

FIGS. 10 and 11 illustrate particular embodiments for reducing switch voltage blocking requirements utilizing the unidirectional and bidirectional switch matrix configurations respectively. Such embodiments result in the individual cells of a corresponding battery module being equalized to a target state of charge. However, the target state of charge in one battery module 100a may be different from the target state of charge for another battery module 100b.

Due to the modular nature of the cell balancing circuitry, many different configurations may be employed. For example, it is possible to have a configuration where one or more battery modules in a battery pack have their states of charge being balanced by embodiments of the cell balancing system, while other battery modules within the same battery pack are balanced using other known cell balancing systems. Furthermore, it is also possible to employ a nested control system where one or more battery modules in a battery pack have their states of charge individually balanced by embodiments of the cell balancing system and a secondary control system for balancing the state of charge across the entire pack. The secondary control system may be an embodiment of the cell balancing system or alternatively a different cell balancing system. Thus, the cell balancing may be applied to electrical energy storage units which may be cells or modules of multiple cells.

Figure 12:
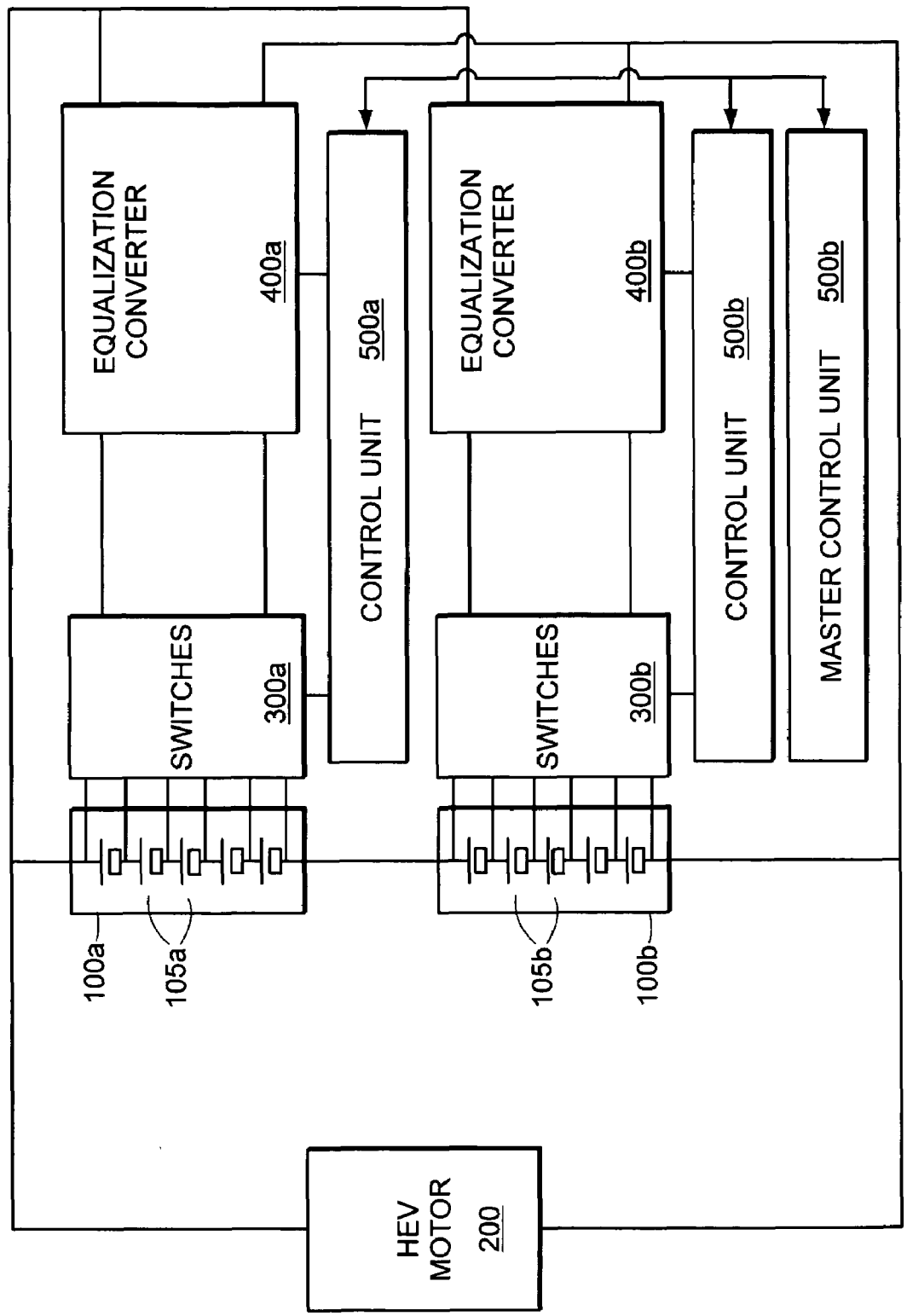
FIG. 12 is a diagram illustrating a cell balancing system according to an alternative embodiment.

FIG. 12 is a diagram illustrating a cell balancing system according to an alternative embodiment. In the illustrated embodiment, equalization converters 400a, 400b are coupled to the terminals of the entire battery pack of M battery modules, resulting in the individual cells of each battery module being equalized to a common target state of charge. However, this configuration requires a switch blocking voltage requirement that is at least equal to the maximum voltage of the pack.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining state of charge of plural series connected electrical energy storage units comprising:
applying a non-dissipative load to a selected storage unit in a string of electrical energy storage units, resulting in an energy transfer between the selected storage unit and the string of storage units through the non-dissipative load; and
determining state of charge of the selected unit from voltage and current data of the selected storage unit resulting from the energy transfer, the state of charge of the selected unit being a fraction of a fully charged capacity of the selected unit.

2. The method of claim 1, wherein the state of charge of the selected unit is determined by taking the difference between a loaded voltage and a product of a current of the selected unit and a present impedance of the selected unit.

3. The method of claim 1 wherein the energy is transferred by pulsed currents.

4. The method of claim 1 wherein determining the state of charge of the selected storage unit comprises:
calculating an impedance of the selected unit from the voltage and current data obtained during the energy transfer.

5. A method for balancing state of charge among plural series connected electrical energy storage units, comprising:
applying a non-dissipative load to a selected storage unit in a string of electrical energy storage units, resulting in an energy transfer between the selected storage unit and the string of storage units through the non-dissipative load;
determining state of charge of the selected unit from voltage and current data of the selected storage unit resulting from the energy transfer, the state of charge of the selected unit being a fraction of a fully charged capacity of the selected unit; and
when the state of charge of the selected unit is different than a target state of charge, transferring energy between the selected unit and the string of storage units, such that the state of charge of the selected unit converges toward the target state of charge.

6. The method of claim 5, comprising:
applying an up-converter to the selected storage unit; and
transferring units of energy from the selected storage unit to the string of storage units.

7. The method of claim 5, comprising:
applying a down-converter to the selected storage unit; and
transferring units of energy from the string of storage units to the selected storage unit.

8. The method of claim 5, wherein determining the state of charge of the selected storage unit comprises:
calculating an impedance of the selected storage unit from the voltage and current data obtained during the energy transfer.

9. The method of claim 8, wherein determining the state of charge of the selected storage unit further comprises:
applying the non-dissipative load to the selected storage unit;
determining a first voltage across the selected storage unit;
determining a first current flowing through the selected storage unit;
determining a second voltage from the first current and impedance of the selected storage unit; and
determining the state of charge based on a voltage difference between the first and second voltages.

10. The method of claim 5, wherein the energy is transferred by pulsed current.

11. The method of claim 5, wherein each of the storage units is a storage cell.

12. The method of claim 5, wherein each of the storage units is a battery module.

13. The method of claim 5, wherein one or more of the storage units comprise a battery pack.

14. The method of claim 5, wherein for each storage unit in the string having a number of storage units, comprising:
applying the non-dissipative load to a selected storage unit, resulting in an energy transfer between the selected storage unit and the string of storage units through the non-dissipative load; and
determining an impedance of the selected storage unit from voltage and current data of the selected storage unit obtained during the energy transfer.

15. The method of claim 14, further comprising:
determining a string impedance from the determined impedance of each storage unit;
determining a first string voltage and string current from the string of storage units;
determining a second string voltage from the string current and the string impedance;
determining a string voltage difference between the first string voltage and the second string voltage; and
determining a target state of charge as the average state of charge for the storage units of the string.

16. The method of claim 15, further comprising:
selecting a storage unit from the string of storage units having a state of charge that is different from the target state of charge;
transferring energy between the selected storage unit and the string of storage units, such that the state of charge of the selected unit converges toward the target state of charge.

17. The method of claim 16, wherein selecting a storage unit from the string of storage units having a state of charge that is different from the target state of charge, comprises:
comparing each of the states of charge of the individual storage units with the target state of charge; and
selecting a storage unit having a state of charge most different from the target state of charge.

18. The method of claim 16, wherein selecting a storage unit from the string of storage units having a state of charge that is different from the target state of charge, comprises:
selecting a storage unit having a state of charge that is different from the target state of charge from the string of storage units in a sequential order.

19. The method of claim 16, wherein transferring energy between the selected storage unit and the string of storage units, comprises:
comparing the state of charge of the selected storage unit with the target state of charge;
when the state of charge is less than the target state of charge, transferring energy from the string of storage units to charge the selected storage unit; and
when the state of charge is greater than the target state of charge, transferring energy from the selected storage unit to charge the string of storage units.

20. The method of claim 19, comprising:
when the state of charge is less than the target state of charge, transferring energy from the string of storage units to charge the selected storage unit until a charge time expires.

21. The method of claim 19, comprising:
when the state of charge is greater than the target state of charge, transferring energy from the selected storage unit to charge the string of storage units until a discharge time expires.

22. A system for determining state of charge of plural series connected electrical energy storage units, comprising:
a circuit configured to apply a non-dissipative load to a selected storage unit in a string of electrical energy storage units, resulting in an energy transfer between the selected storage unit and the string of storage units; and
a controller configured to determine state of charge of the selected unit from voltage and current data of the selected storage unit resulting from the energy transfer, the state of charge of the selected unit being a fraction of a fully charged capacity of the selected unit.

23. The system of claim 22, wherein the state of charge is the difference between a loaded voltage and a product of a current of the selected unit and a present impedance of the selected unit.

24. The system of claim 22, wherein the energy is transferred by pulsed current.

25. The system of claim 22, wherein the controller is further configured to calculate an impedance of the selected storage unit from the voltage and current data obtained during the energy transfer.

26. A system for balancing state of charge of plural series connected electrical energy storage units, comprising:
a circuit configured to apply a non-dissipative load to a selected storage unit in a string of electrical energy storage units, resulting in an energy transfer between the selected storage unit and the string of storage units; and
a controller configured to determine state of charge of the selected unit from voltage and current data of the selected storage unit obtained during the energy transfer, the state of charge of the selected unit being a fraction of a fully charged capacity of the selected unit; and to direct the non-dissipative load to transfer energy between the selected storage unit and the string of storage units-when the state of charge of a selected unit is different than a target state of charge such that the state of charge of the selected unit converges toward the target state of charge.

27. The system of claim 26, wherein the non-dissipative load is an up-converter configured to transfer units of energy from the selected storage unit to the string of storage units.

28. The system of claim 26, wherein the non-dissipative load is a down-converter configured to transfer units of energy from the string of storage units to the selected storage unit.

29. The system of claim 26, wherein the controller is further configured to calculate an impedance of the selected storage unit from the voltage and current data obtained during the energy transfer.

30. The system of claim 29, wherein:
the circuit is configured to apply the non-dissipative load to the selected storage unit
and the controller is further configured to determine a first voltage across the selected storage unit, a first current flowing through the selected storage unit, a second voltage from the first current and impedance of the selected storage unit, and
the state of charge based on a voltage difference between the first and second voltages.

31. The system of claim 26, wherein the energy is transferred by pulsed current.

32. The system of claim 26, wherein each of the storage units is a storage cell.

33. The system of claim 26, wherein each of the storage units is a battery module.

34. The system of claim 26, wherein one or more of the storage units comprise a battery pack.

35. The system of claim 26, wherein for each storage unit in the string having a number of storage units:
- the circuit is configured to apply the non-dissipative load to a selected storage unit, resulting in an energy transfer between the selected storage unit and the string of storage units; and
- the controller is configured to determine an impedance of the selected storage unit from voltage and current data of the selected storage unit observed from the energy transfer.

36. The system of claim 35, wherein the controller is further configured to determine:
- a string impedance from the determined impedance of each storage unit;
- a first string voltage and string current from the string of storage units;
- a second string voltage from the string current and the string impedance;
- a string voltage difference between the first string voltage and the second string voltage; and
- a target state of charge as the average state of charge for the storage units of the string.

37. The system of claim 26, wherein the controller is further configured to:
- select a storage unit from the string of storage units having a state of charge that is different from the target state of charge; and
- direct the non-dissipative load to transfer energy between the selected storage unit and the string of storage units, such that the state of charge of the selected unit converges toward the target state of charge.

38. The system of claim 37, wherein the controller is further configured to:
- compare each of the states of charge of the individual storage units with the target state of charge; and
- select a storage unit having a state of charge most different from the target state of charge.

39. The system of claim 37, wherein the controller is configured to: select a storage unit having a state of charge that is different from the target state of charge from the string of storage units in a sequential order.

40. The system of claim 37, wherein:
- the controller is configured to compare the state of charge of the selected storage unit with the target state of charge, to direct the non-dissipative load to transfer energy from the string of storage units to charge the selected storage unit when the state of charge of the selected storage unit is less than the target state of charge, and to direct the non-dissipative load to transfer energy from the selected storage unit to the string of storage units to charge the string of storage units when the state of charge of the selected storage unit is greater than the target state of charge.

41. The system of claim 40, wherein:
- the controller is further configured to direct the non-dissipative load to transfer energy from the string of storage units to charge the selected storage unit until a charge time expires when the state of charge is less than the target state of charge.

42. The system of claim 40, wherein:
- the controller is further configured to direct the non dissipative load to transfer energy from the selected storage unit to charge the string of storage units until a discharge time expires when the state of charge is greater than the target state of charge.

* * * * *